US008810880B2

(12) United States Patent
Hamano et al.

(10) Patent No.: US 8,810,880 B2
(45) Date of Patent: Aug. 19, 2014

(54) OPTICAL SCAN UNIT, IMAGE PROJECTOR INCLUDING THE SAME, VEHICLE HEAD-UP DISPLAY DEVICE, AND MOBILE PHONE

(75) Inventors: Yukiko Hamano, Kawasaki (JP); Hiroshi Akiyama, Yokohama (JP); Yoshitaka Takahashi, Noda (JP)

(73) Assignee: Ricoh Company, Ltd., Tokyo (JP)

( * ) Notice: Subject to any disclaimer, the term of this patent is extended or adjusted under 35 U.S.C. 154(b) by 464 days.

(21) Appl. No.: 13/054,739

(22) PCT Filed: Jun. 16, 2009

(86) PCT No.: PCT/JP2009/061271

§ 371 (c)(1), (2), (4) Date: Jan. 18, 2011

(87) PCT Pub. No.: WO2010/010773

PCT Pub. Date: Jan. 28, 2010

(65) Prior Publication Data

US 2011/0128602 A1 Jun. 2, 2011

(30) Foreign Application Priority Data

Jul. 23, 2008 (JP) ................................. 2008-189993
Mar. 27, 2009 (JP) ................................. 2009-077949

(51) Int. Cl.
*G02B 26/08* (2006.01)

(52) U.S. Cl.
USPC .................. 359/204.1; 359/205.1; 359/207.2; 359/207.3; 359/207.4; 353/69

(58) Field of Classification Search
USPC ............. 359/205.1–208.2, 204.1–204.5, 618, 359/629
See application file for complete search history.

(56) References Cited

U.S. PATENT DOCUMENTS 5,694,180 A 12/1997 Deter et al.
6,088,167 A 7/2000 Yamakawa
6,590,606 B1 7/2003 Hiller et al.

(Continued)

FOREIGN PATENT DOCUMENTS

FR 2 906 505 A1 4/2008
JP 9 133887 5/1997

(Continued)

OTHER PUBLICATIONS

Russian Notice of Decision of Grant issued Apr. 28, 2012 in Patent Application No. 2011106767/28(009612) with English Translation.

(Continued)

*Primary Examiner* — James Phan
(74) *Attorney, Agent, or Firm* — Oblon, Spivak, McClelland, Maier & Neustadt, L.L.P.

(57) ABSTRACT

An optical scan unit (10) is configured to include a light source (11), a divergent light conversion element (12) having such positive power as to convert divergent light from the light source (11) into convergent light to form a spot on a projection plane, an optical deflector (13) deflecting a light beam from the divergent light conversion element (12) to a first scan direction and a second scan direction which is orthogonal to the first scan direction, and a deflection angle conversion element 14 (14) having such negative power as to convert a deflection angle of the light deflected by the optical deflector (13).

11 Claims, 23 Drawing Sheets

(56) References Cited

U.S. PATENT DOCUMENTS

| | | | | |
|---|---|---|---|---|
| 7,385,745 | B2 | 6/2008 | Ishihara | |
| 7,677,736 | B2 | 3/2010 | Kasazumi et al. | |
| 2004/0075914 | A1 | 4/2004 | Yamamoto | |
| 2005/0117188 | A1 * | 6/2005 | Ishihara | 359/207 |
| 2006/0131492 | A1 | 6/2006 | Kobayashi et al. | |
| 2006/0139718 | A1 | 6/2006 | Ishihara | |
| 2006/0239009 | A1 | 10/2006 | Nanjyo et al. | |
| 2008/0074650 | A1 | 3/2008 | Fujihara et al. | |
| 2009/0289950 | A1 | 11/2009 | Hamano et al. | |

FOREIGN PATENT DOCUMENTS

| | | | |
|---|---|---|---|
| JP | 10-269608 | A | 10/1998 |
| JP | 2000 509522 | | 7/2000 |
| JP | 2000-260052 | A | 9/2000 |
| JP | 2002-109771 | A | 4/2002 |
| JP | 2002-207110 | A | 7/2002 |
| JP | 2004 138822 | | 5/2004 |
| JP | 2005 234157 | | 9/2005 |
| JP | 2006 178346 | | 7/2006 |
| JP | 2006 301299 | | 11/2006 |
| JP | 2006-317681 | A | 11/2006 |
| WO | 2005 083493 | | 9/2005 |
| WO | WO 2007/120125 | A1 | 10/2007 |
| WO | WO 2008/040899 | A1 | 4/2008 |

OTHER PUBLICATIONS

Extended Search Report issued Jan. 31, 2012 in European Patent Application No. 09800288.4-1234.

International Search Report issued Oct. 6, 2009 in PCT/JP09/061271 filed Jun. 16, 2009.

European Office Action Issued Jun. 12, 2013 in Patent Application No. 09 800 288.4.

Office Action issued on Mar. 12, 2013, in Japanese Patent Application No. 2009-077949.

* cited by examiner

OPTICAL SCAN UNIT, IMAGE PROJECTOR INCLUDING THE SAME, VEHICLE HEAD-UP DISPLAY DEVICE, AND MOBILE PHONE

TECHNICAL FIELD

The present invention relates to an optical scan unit and an image projector including the same. In particular, it relates to an image projector which creates two-dimensional images on a projection plane by two-dimensionally scanning with a light beam by use of an optical deflector and which is suitable to be mounted in a small-size electronic device such as a mobile phone or a vehicle head-up display.

BACKGROUND ART

Heretofore, an image projector has been widespread, which comprises an illumination system including a light source, a spatial light modulator modulating intensity of light from the illumination system, and a projection lens imaging the light modulated with the spatial light modulator. There has been an increasing demand for downsizing of the image projector.

Also, as a light source, an LED and an LD (laser diode) have been popular, and a small-size electronic device such as a mobile phone incorporating an image projector has been developed.

Another kind of image projector using an optical scan unit has been proposed. In this optical scan unit, an optical deflector two-dimensionally deflects a light beam from a light source to two-dimensionally scan a projection plane with spots and form a two-dimensional image using afterimage effects. Such an optical scan unit adopts a polygon mirror, a galvano mirror, MEMS devices manufactured by MEMS (Micro Electro Mechanical System) technology, or the like for an optical deflector deflecting a light beam from the light source.

Such an optical scan unit has a problem that projected images may have various kinds of deformations due to the two-dimensional scanning. In view of solving this problem, various attempts have been made.

One example is an optical scan system as an f-arcsine θ lens in a rotationally asymmetric shape to achieve constant speed scanning and correct image deformation, as disclosed in Japanese Unexamined Patent Application Publication No. 2006-178346 (Reference 1) for example.

Another example is an optical scan system having a rotationally asymmetric reflective face to correct trapezoidal deformations or TV distortions, as disclosed in Japanese Unexamined Patent Application Publication No. 2005-234 157 (Reference 2) for example.

Still another example is an optical correction system as a columnar lens with a concave face which corrects unevenness in brightness of an image caused by scan angles, as disclosed in International Patent Application Publication No. WO 2005/083493 (Reference 3) for example.

There is an increasing demand for an image projector mounted in a small-size electronic device as a mobile phone to perform a close range projection in which larger two-dimensional images are formed in a very close range from the device to a projection plane. The close range projection includes not only vertical projection (onto a plane orthogonal to a traveling direction of a scanning light beam) in a close range but also projecting a two-dimensional image 62 on a plane 61 on which a mobile phone 60 is placed, as shown in FIG. 29, for example. The mobile phone 60 incorporates an image projector as an ultracompact projection engine. The image projector is required to be able to project good two-dimensional images on the plane 61 and to be an optical system with relatively simple structure unlike ones in the prior art with a complex structure in view of miniaturization.

However, there is a limitation to the deflection angle θ of the optical deflector included in a MEMS device or the like. For example, at the maximum deflection angle θ of the optical deflector being ±8 degrees, a scan angle of a light beam will be ±16 degrees so that obtainable images are limited to ones with total angle of field of 32 degrees. To form an A4 size projected image using the optical deflector, the small-size electronic device will need a long distance over 50 cm.

Therefore, it is necessary to deflect a light beam at an increased angle with the optical deflector in order to achieve the close range projection in the optical scan unit which two-dimensionally scans.

However, the optical scan systems disclosed in References 1 and 2 are so complex and large structures that they are not suitable for small-size electronic devices as a mobile phone. They are not suitable for achieving size reduction and close range image projection at the same time.

Further, the optical scan system disclosed in Reference 3 corrects a deflection angle of light to make spot scan speed constant on an image plane (projection plane) for the purpose of achieving uniform brightness distribution. However, it fails to disclose or teach a compact scan system which is able to project a large image on a plane in a very close range.

DISCLOSURE OF THE INVENTION

An object of the present invention is to provide an optical scan unit which realizes a large scan angle using an optical deflector with a small deflection angle, an image projector which can project large two-dimensional images in a very close range, and a vehicle head-up display and a mobile phone incorporating the image projector.

According to one aspect of the present invention, an optical scan unit comprises a light source; a divergent light conversion element having such positive power as to convert divergent light from the light source into convergent light to form a spot on a projection plane; an optical deflector deflecting light from the divergent light conversion element to a first scan direction and a second scan direction which is orthogonal to the first scan direction; and a deflection angle conversion element having such negative power as to convert a deflection angle of the light deflected by the optical deflector. The positive power refers to such lens power as to convert parallel light into convergent light while the negative power refers to such lens power as to convert parallel light into divergent light.

In one features of the above aspect, the deflection angle conversion element is made of a single lens.

In the other features of the above aspect, the deflection angle conversion element is made of a plurality of lenses formed of different glass materials.

In the other features of the above aspect, the optical deflector is comprised of a first deflector portion which deflects light from the divergent light conversion element in the first scan direction, and a second deflector portion which deflects light from the divergent light conversion element in the second scan direction; and the first and second deflectors are integrally formed.

In the other features of the above aspect, the optical deflector includes a mirror portion which is rotatable by the first and second deflector portions, and an incidence angle between a normal direction of the mirror portion and a traveling direction of light emitted from the light source and transmitting through the divergent light conversion element is set to be 45 degrees or less in the first and second scan directions.

In the other features of the above aspect, the optical scan unit further comprises a beam splitter between the optical deflector and the deflection angle conversion element to make a traveling direction of light emitted from the light source and transmitting through the divergent light conversion element coincide with a normal direction of the mirror portion in a reference position in the first and second scan directions and the optical deflector includes a mirror portion which is rotatable by the first and second deflector portions.

In the other features of the above aspect, the optical deflector is comprised of an optical vibration element which reciprocatively moves around a support shaft in the first and second scan directions. Further, where a referential optical axis is a traveling direction of light deflected by the optical vibration element when the optical vibration element is in a reference position, a deflection angle θ is an angle of traveling light deflected by the optical deflector relative to the referential optical axis, and a scan angle α is an angle of traveling light converted by the deflection angle conversion element relative to the referential optical axis, the deflection angle conversion element converts a deflection angle of incident light having passed on a referential optical axis so as to satisfy $\theta=\alpha$, and converts a deflection angle of incident light not having passed on the referential optical axis so as to satisfy $\theta<\alpha$.

In the other features of the above aspect, the divergent light conversion element and the deflection angle conversion element are rotationally symmetric lenses.

In the other features of the above aspect, the deflection angle conversion element is a rotationally asymmetric lens.

In the other features of the above aspect, at least one face of the deflection angle conversion element is formed in aspherical shape.

In the other features of the above aspect, an optical axis direction from the optical deflector to the deflection angle conversion element is inclined relative to a projection plane which is two-dimensionally scanned with light deflected in the first and second scan directions by the optical deflector and emitted via the deflection angle conversion element.

According to another aspect of the present invention, an image projector comprises the above-identified optical scan unit and a control unit controlling the optical scan unit, wherein the control unit comprises a light source control circuit which controls light emission of the light source, a deflection angle control circuit which controls a deflection angle of the optical deflector, and an image processing circuit which appropriately corrects acquired image data and outputs corrected image data to the deflection angle control circuit and the light source control circuit.

According to still another aspect of the present invention, a vehicle head-up display device comprises the above-identified image projector.

According to still another aspect of the present invention, a mobile phone comprises the above-identified image projector.

BRIEF DESCRIPTION OF THE DRAWINGS

FIG. 4A shows a change in scan angle (deflection angle), FIG. 4B shows a change in scan speed, and FIG. 4C shows a change in the scan speed obtained from FIG. 4B by normalized maximal values.

BEST MODE FOR CARRYING OUT THE INVENTION

Hereinafter, embodiments of the present invention will be described in detail with reference to the accompanying drawings.

First Embodiment

Figure 1:
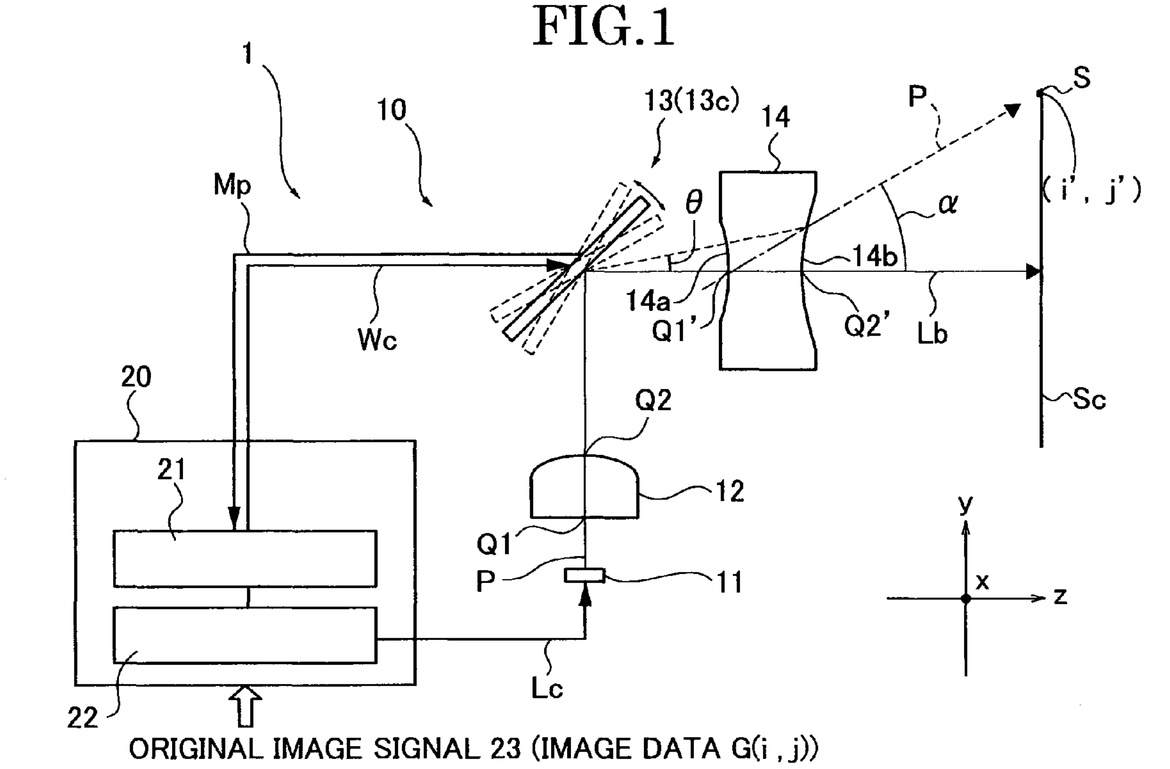
FIG. 1 schematically shows the structure of an image projector according to a first embodiment of the present invention.
Figure 2:
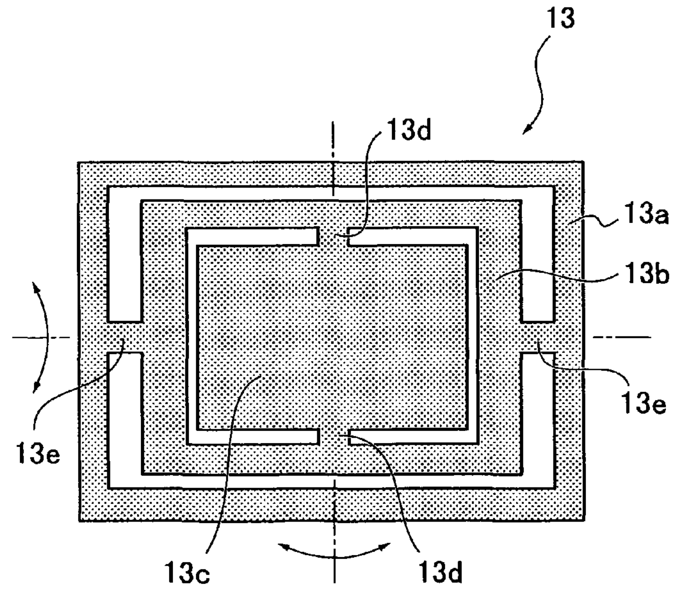
FIG. 2 schematically shows the structure of an optical deflector.

FIG. 1 schematically shows an image projector 1 according to the first embodiment and FIG. 2 schematically shows the structure of an optical deflector 13. In FIG. 1 an angle between a principal ray deflected by the optical deflector 13 and a referential optical axis Lb is defined as deflection angle θ while an angle between a principal ray having transmitted through a deflection angle conversion element 14 and the referential optical axis Lb is defined as scan angle α. The referential optical axis refers to a traveling direction of a principal ray deflected (reflected) by the optical deflector 13 when the optical deflector 13 is in the reference position (stationary position: θ=α=0) as described later.

In the first embodiment, the image projector 1 comprises an optical scan unit 10 and a control unit 20. The optical scan unit 10 mainly comprises a light source 11, a divergent light conversion element (coupling lens) 12, an optical deflector 13 (optical vibration element), and a deflection angle conversion element 14 which constitute an optical projection system to project images on a screen Sc.

The light source 11 is a monochrome light source as a semiconductor laser emitting a red light beam with a center wavelength of 638 nm in the present embodiment. The light source 11 and optical deflector 13 are controlled to emit by the control unit 20 described later.

The divergent light conversion element 12 is configured to have positive power to convert divergent light (hereinafter, light beam P) emitted from the light source 11 into convergent light. That is, the divergent light conversion element 12 converts a divergent angle of the light beam P from the light source 11 to a convergent angle so as to form spots S in a predetermined size on the screen Sc.

The optical deflector 13 deflects, for scanning, the light beam P as a convergent light from the divergent light conversion element 12 in first and second scan directions which are two-dimensionally orthogonal to each other. The first and second scan directions are included in a projection plane (screen Sc) and in FIG. 1 they are a direction orthogonal to the drawing (see the arrow x) and a vertical direction (see the arrow y) seen from the front.

In FIG. 2 the optical deflector 13 mainly comprises a rectangular outer frame 13*a* (first deflector portion), a rectangular inner frame 13*b* (first deflector portion) placed inside the outer frame 13*a*, and a movable rectangular mirror portion 13*c* placed inside the inner frame 13*b*. The mirror portion 13*c* includes a mirror face reflecting a light beam and is rotatably supported by the inner frame 13*b* via a pair of support shafts 13*d*. The inner frame 13*b* is rotatably supported by the outer frame 13*a* via a pair of support shafts 13*e* which extend orthogonally relative to the support shafts 13*d*. Thus, the mirror portion 13*c* is rotated in a horizontal direction around the pair of support shafts 13*d* while the inner frame 13*b* is rotated in a vertical direction around the pair of support shafts 13*e*, for example. One of the rotary directions is the first scan direction and the other is the second scan direction.

Such an optical deflector 13 can be comprised of a known MEMS mirror made of silicon crystals. For example, in this MEMS mirror, the mirror portion 13*c* and inner frame 13*b* are formed above the bottom of a silicon crystal substrate by etching.

In the MEMS mirror, not-shown two electrodes are formed on a bottom substrate of the mirror portion corresponding to right and left portions of the mirror portion 13*c*. By applying a voltage between the electrode of the mirror portion 13*c* and the two electrodes on the bottom substrate, electrostatic forces act on the pair of support shafts 13*d* and incline the mirror portion 13*c*.

Also, in the MEMS mirror, not-shown two electrodes are formed on a bottom substrate of the inner frame 13*b* corresponding to top and bottom portions of the inner frame 13*b*. By applying a voltage between the electrode of the inner frame 13*b* and the two electrodes on the bottom substrate, electrostatic forces act on the pair of support shafts 13*e* and incline the inner frame 13*b*.

The mirror portion 13*c* can be configured to include a magnetic element on its back face and be inclined by a magnetic force from a coil on the bottom substrate, or it can be configured to be inclined by a deformation force of a piezoelectric element. It should not be limited to the one in the first embodiment.

In order to deflect a light beam with such a MEMS mirror at high speed, the mirror portion 13*c* need be driven at about a resonance point. Because of this, the deflection angle or inclination angle of the mirror portion 13*c* has to be changed in a sine wave form relative to time. The mirror portion 13*c* is extremely small in size of about 1 mm and its rotation moment is very small so that the primary resonant frequency thereof can be increased in a deformation direction according to the thickness or width (design) of the pair of support shafts 13*d*. It is possible to easily obtain a high primary resonant frequency around the support shafts 13*d* (horizontal direction). In the present embodiment, the rotation around the support shafts 13*d* or horizontal scanning is set to a high-speed scan direction (main scan direction) while the rotation around the support shafts 13*e* or vertical scanning is set to a sub scan direction.

It is difficult to achieve an increase in amplitude of the mirror portion 13*c* by a general drive technique and to stabilize the movement thereof due to a non-uniform drive force, air resistance or the like. However, the MEMS mirror according to the present embodiment can stably move with amplitude large enough to scan the entire screen Sc since the mirror portion 13*c* is driven at around the primary resonant frequency. Further, it is necessary to increase the amplitude of the inner frame 13*b* which rotates/vibrates in the direction (around the support shafts 13*e*) orthogonal to the rotation/vibration direction of the mirror portion 13*c*, for the purpose of achieving a very close range projection. However, since it is the sub scan direction, the inner frame 13*b* has to be driven in the sub scan direction at a low frequency which depends on the number of frames of an image per second (for example, 30, 60, or 120 Hz for image generation of 30, 60 or 120 frames per second). To drive the inner frame 13*b* at a low frequency by a resonance between the inner frame 13*b* and the support shafts 13*e*, it is necessary to form very thin support shafts 13*e* as rotation axes but this is not practical because thin shafts cannot have sufficient impact resistance and can easily get broken. To increase the thickness of the support shafts 13*e*, a resonant frequency A of the rotation (vibration) around the support shafts 13*e* has to be set to a high value. Since a resonant frequency B of the inner frame 13*b* is set to a low value, and the resonant frequencies A, B do not coincide with each other, resonance cannot be utilized here. In conclusion, it is necessary to use larger power in order to obtain a desired amplitude of the mirror portion 13*c*. To drive the mirror portion with resonance in the sub scan direction, a double axis scanning (for example, disclosed in Japanese Examined Patent Application Publication No. 2005-5262899) can be a good way to generate images instead of raster scanning. By the double axis scanning, the mirror portion 13*c* can be driven with resonant vibration with high amplitude in both of the main and sub scan directions, enabling close range projection with small power.

The convergent light deflected by the optical deflector 13 constituted of the above MEMS mirror and transmitting through the divergent light conversion element 12 is swept in the two-dimensionally orthogonal directions, the first scan (horizontal) direction and the second (vertical) scan direction In the first embodiment, the first and second deflector portions are integrally formed, however; they can be formed independently. For example, two MEMS sensors as a single axis rotary element can be used or a flat mirror can be attached to an output shaft of a stepping motor and rotated at a constant angular velocity.

Further, the optical deflector is configured for two-dimensional scanning; however, it can be configured for one dimensional scanning.

Another issue to be addressed concerning the above optical projection system is that in order to project large images on the screen Sc in a very close range, the amplitude of the mirror portion 13*c* need be further increased.

However, with an increased amplitude, the mirror portion 13*c* cannot stably drive due to non-uniform drive force or air resistance. It is very difficult to generate a drive force great enough to achieve a large amplitude in the first place. Specially, the higher the resonant frequency is, the more difficult to attain a large amplitude is. For solving this problem, the weight of the mirror portion 13 can be reduced by thinning the thickness thereof or reducing the size thereof.

Figure 12:
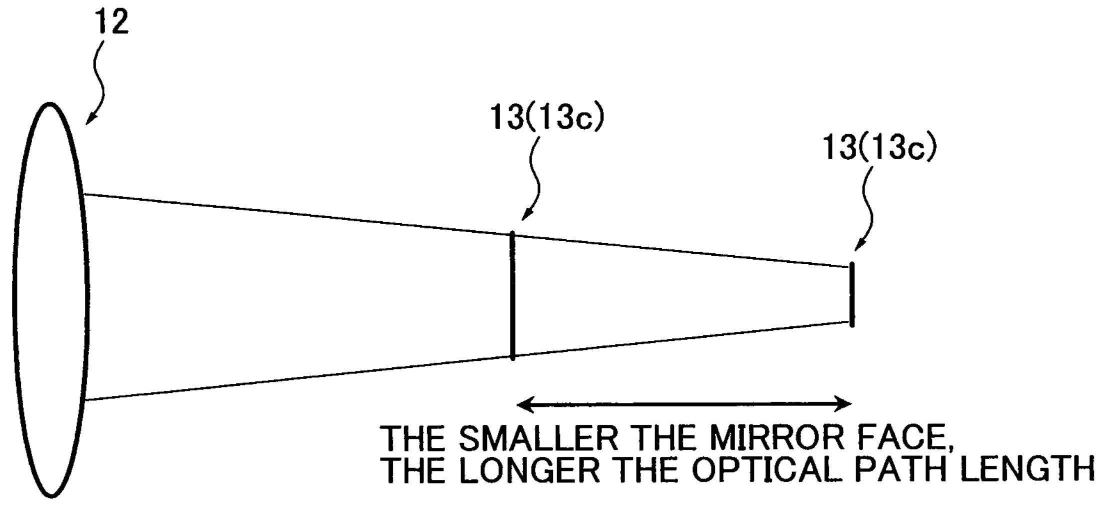
FIG. 12 shows a relation between a beam size on a mirror portion and a divergent light conversion element.

However, a problem arises from the thinning and size reduction of the mirror portion 13*c*. With a thinned mirror portion 13*c*, an amount of deformation may be increased, causing a brokerage of the optical deflector 13, or reflecting light with the deformed mirror portion 13*c* may increase optical aberration, preventing stable generation of spots S on the screen Sc and reducing resolution of projected images. On the other hand, with a size-reduced mirror portion 13*c*, the divergent light conversion element 12 needs to focus convergent light in a smaller beam size on the mirror portion 13*c*, and for achieving the smaller beam size, assembly and manufacture precisions of components need be improved. However, since NA (numerical aperture) of the divergent light conversion element 12 is determined to form a predetermined size of spots S on the screen Sc based on the light beam P from the light source 11 as described above, a distance (optical path) from the divergent light conversion element 12 to the mirror portion 13*c* (optical deflector 13) has to be lengthened as shown in FIG. 12 for reducing the beam size on the mirror portion 13*c*. This will prevent a size reduction of the entire optical system. In contrast, when the distance between the two is set to a short value, the beam size of the light beam from the divergent light conversion element 12 will be larger than the effective reflective face of the mirror portion 13*c*. Efficient use of the light beam from the light source 11 may be prevented.

With the above problems taken into consideration, the amplitude of the mirror portion 13*c* is set to ±7.5 degrees in the present embodiment. In other words, the maximum value of the deflection angle θ of the light beam P deflected by the optical deflector 13 is ±15 degrees. With use of only the optical deflector 13 (without the deflection angle conversion element 14), for example, to obtain a two-dimensional image of A4 size (210 mm×297 mm), a projection range of about 560 mm will be needed, and to obtain a 14-inch size two-dimensional image a projection range of about 500 mm will be needed. These are large distances. Thus, only with the optical deflector 13, the image projector cannot project images in a very close range projection.

Figure 13:
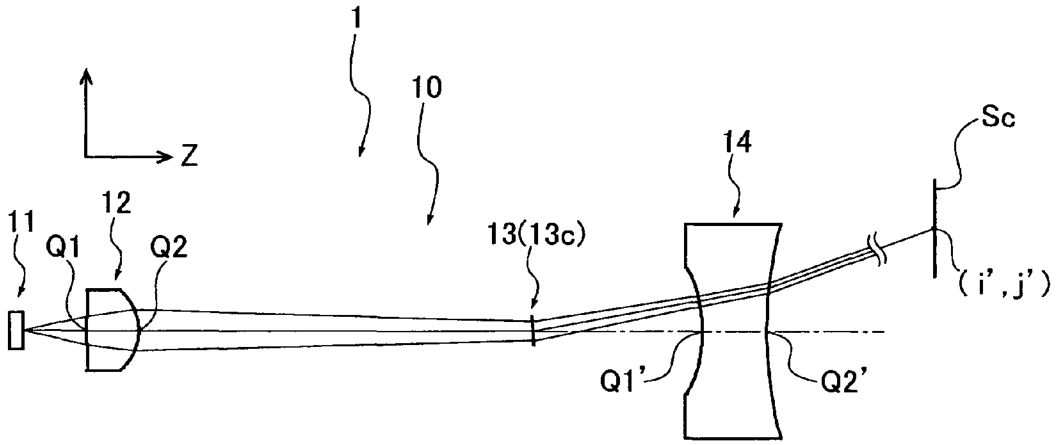
FIG. 13 shows optical paths obtained in a simulation by use of an optimally designed optical system (optical scan unit).

According to the image projector 1 of the present embodiment, the deflection angle conversion element 14 and the divergent light conversion element 12 are optimally designed with the size, dimension and amplitude of the mirror portion 13*c* of the optical deflector 13 taken into account. The deflection angle conversion element 14 is configured to be a deflection angle enlarging element which converts the deflection angle θ of the light beam deflected by the optical deflector 13 into a scan angle α larger than the deflection angle θ. In the present embodiment, the deflection angle conversion element 14 is a single lens made of a single glass material, for example. FIG. 13 shows optical paths obtained in a simulation by use of an optimally designed optical system (optical scan unit 10). FIG. 13 schematically shows an optical path among linearly arranged components of the optical system from the light source 11 to the deflection angle conversion element 14 and optical paths as simulation results when the mirror portion 13*c* is inclined by a predetermined angle. In this simulation, a light beam with wavelength of 530 nm is assumed to be emitted from the light source 11.

In the first embodiment (also in the simulation of FIG. 13), the focal length of the divergent light conversion element 12 is set to 3.91 mm, and a distance from the light source 11 to a first face (opposite to the light source 11) of the divergent light conversion element 12 is set to 3 mm. The center thickness thereof is 2.4 mm and it is made of a glass material with refractive index $n_{CL}$ being 1.5196. A distance from a second face of the divergent light conversion element 12 to a reflective face of the optical deflector 13 is set to 18.354 mm while that from a reflective face of the optical deflector 13 to the first face of the deflection angle conversion element 14 is set to 8 mm. The deflection angle conversion element 14 has a center thickness of 3 mm and is made of a glass material with refractive index $n_{EXP}$ being 1.5196. This optical system (optical scan unit 10) is designed to focus light from the light source 11 on a position 200 mm away from the second face of the deflection angle conversion element 14.

Both of the lens faces of the divergent light conversion element 12 are aspherical. The aspherical shape thereof is expressed by the following formula (1) based on a relation between a distance z of the lens faces in the optical axis direction and a radius h in orthogonal coordinate system in which the optical axis direction of light from the light source 11 to the optical deflector 13 is a Z-axis direction and apices Q1, Q2 of the lens faces are origin points.

$$z = \frac{ch^2}{1 + SQRT[1-(1+k)c^2h^2]} + Ah^4 + Bh^6 + Ch^8 + Dh^{10} + Eh^{12} + Fh^{14} + Gh^{16} + Hh^{18} + Jh^{20} \quad (1)$$

$$h^2 = x^2 + y^2$$

where c is a paraxial curvature (c=1/r where r is curvature radius), k is a conic constant, A, B, C, D, E, F, G . . . are aspherical coefficients. Note that "SQRT (Q)" signifies a square root of Q in the formula (1).

Table 1 below shows data on the respective faces of the divergent light conversion element 12. In the table 1 "E-0*n*" signifies $10^{-n}$.

TABLE 1

| | FIRST FACE | SECOND FACE |
|---|---|---|
| r | 11.305091 | −2.298941 |
| k | 0 | 0 |
| A | −1.44724E−02 | 4.64187E−03 |
| B | −1.31006E−04 | 4.18303E−04 |
| C | 1.27580E−04 | 6.37029E−05 |
| D | 4.06654E−05 | 2.07440E−05 |

Figure 3A:
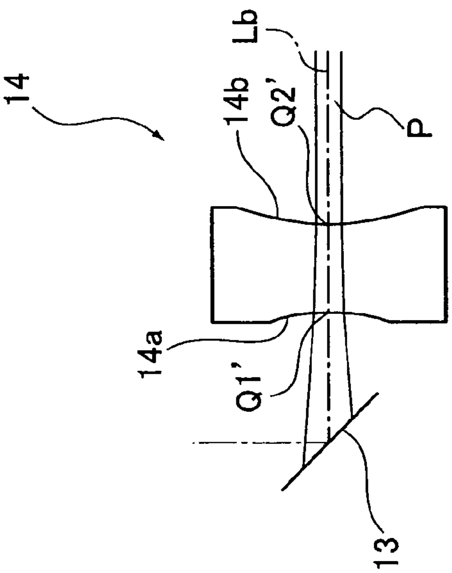
FIG. 3A shows a convergent light along a referential optical axis Lb.
Figure 3B:
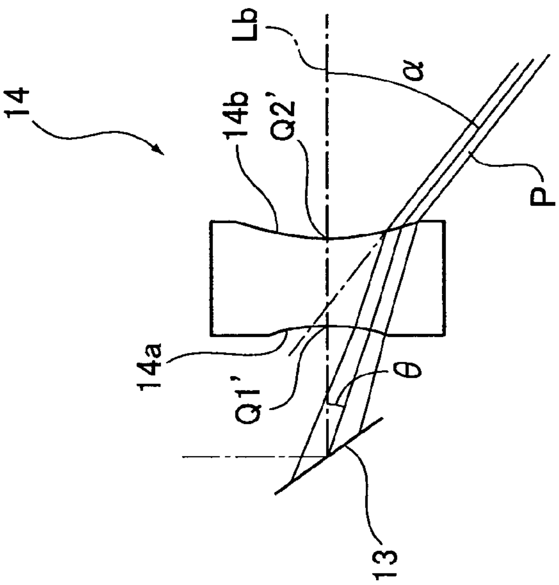
FIG. 3B shows a convergent light with an inclination angle (deflection angle θ) relative to the referential optical axis Lb when the convergent light transmits through the deflection angle conversion element.
Figure 3C:
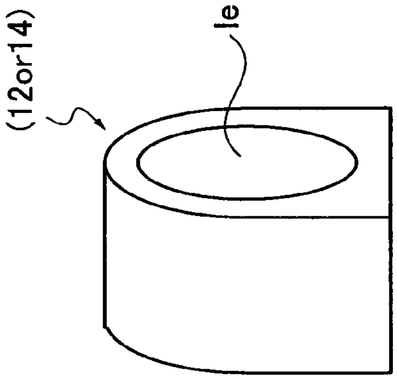
FIG. 3C shows an optical element which is rotationally asymmetric.

Convergent light from the divergent light conversion element 12 is directed to the deflection angle conversion element 14 through the optical deflector 13. FIGS. 3A to 3C shows how convergent light deflected by the optical deflector 13 transmits through the deflection angle conversion element 14. In FIG. 3A convergent light travels along the referential optical axis Lb, and in FIG. 3B convergent light is inclined at an angle (deflection angle θ) relative to the referential optical axis Lb. In FIG. 3A to 3B, numeric codes 14*a*, 14*b* represent the incidence face and exit face of the deflection angle conversion element 14, respectively, which will be described later.

The deflection angle conversion element 14 is configured to have negative power and convert a convergent light beam from the divergent light conversion element 12 into a weaker convergent light beam to focus (reduce the beam size to be smaller than a predetermined beam size) it on the screen Sc. Also, the deflection angle conversion element 14 converts incidence light with a deflection angle θ into an outgoing light beam with a scan angle α which is an angle relative to the referential optical axis, as shown in FIG. 3B. In the first embodiment, the design and arrangement of the deflection angle conversion element 14 is determined so as to satisfy deflection angle θ=scan angle α when the light beam is incident on the referential optical axis Lb, and satisfy deflection angle θ<scan angle α when the light beam is not incident on the referential optical axis Lb. Also, the deflection angle conversion element 14 is designed and arranged so that it converts an incident light beam with the deflection angle θ of 10 degrees into an outgoing light beam with scan angle α of 20 degrees, and a light beam with the maximum deflection angle θ of 15 degrees into one with the scan angle α of 31.3 degrees. That is, it almost doubles the size of the light beam. The maximum deflection angle θ of the incident light beam is ±15 degrees since the light beam is deflected by the mirror portion 13*c* of the optical deflector 13 whose maximum amplitude is set to ±7.5 degrees.

The deflection angle conversion element 14 includes an aspherical first face (on the side of the optical deflector 13) and a spherical second face. The aspherical shape thereof is expressed by the above formula (1) based on a relation between a distance z of the lens face in the optical axis direction and a radius h in orthogonal coordinate system in which a straight line connecting apices Q1', Q2' of the first and second faces, or the optical axis direction of light from the light source 11 to the screen Sc is a Z-axis direction. Data on the first and second lens faces is shown in the following table 2.

TABLE 2

| | FIRST FACE | SECOND FACE |
|---|---|---|
| r | −6.267876 | 19.975324 |
| k | 0 | 0 |
| A | 8.78931E−04 | 0 |
| B | −2.92949E−04 | 0 |
| C | 6.96796E−05 | 0 |
| D | −6.36735E−06 | 0 |

In the first embodiment, the deflection angle conversion element 14 is configured to include the aspherical first face and the spherical second face; however, the present invention is not limited thereto. Both of the first and second faces can be aspherical, or they can be spherical depending on a required level of spots or projected images on the screen Sc.

The lens faces of the deflection angle conversion element 14 and the divergent light conversion element 12 are formed in rotationally symmetric shape. Because of this, both the elements can be easily machined. Moreover, they can be easily assembled since manufacturing tolerance or adjusting tolerance can be set to a large value. Among the lens faces of the deflection angle conversion element 14 and the divergent light conversion element 12, only ones (Ie) through which light transmits have to be rotationally symmetric. When they are made of resin materials or the like, the overall outer forms thereof can be rotationally asymmetric with assembly, adjustment or else taken into account, as shown in FIG. 3C.

Figure 4B:
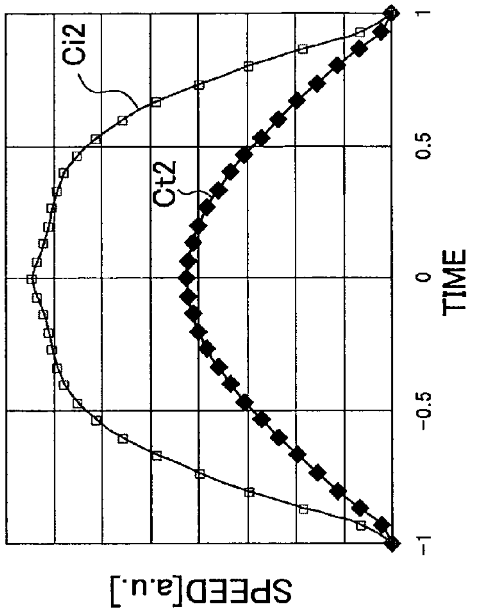
FIGS. 4A to 4C are graphs showing measured values with and without the deflection angle conversion element.
Figure 4C:
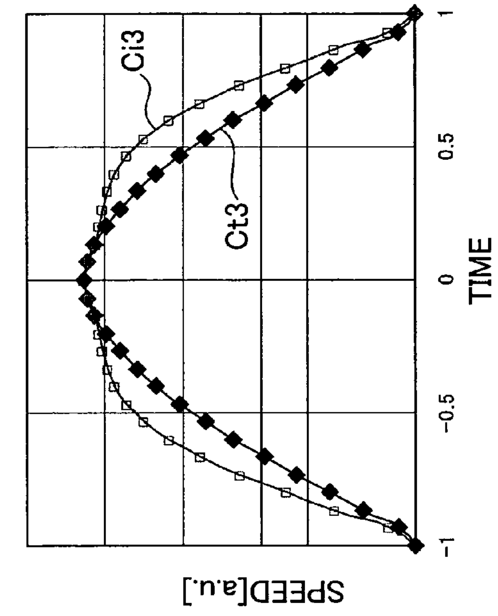
Figure 4A:
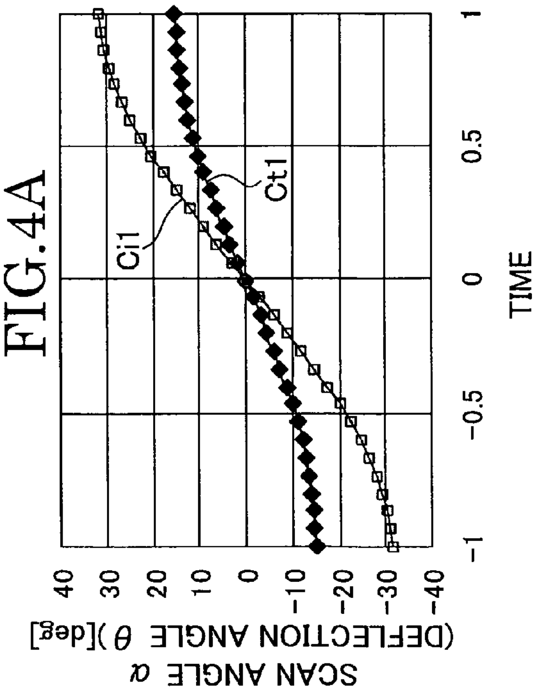

With reference to FIGS. 4A to 4C, the effects of the deflection angle conversion element 14 are described. FIGS. 4A to 4C are graphs of measured values with and without the deflection angle conversion element 14. In FIGS. 4A to 4C a code Ci is a characteristic curve of scan angle with the deflection angle conversion element 14 while a code Ct is the same without the deflection angle conversion element 14. Also, in the drawings the horizontal axis indicates time with the center angle of the mirror portion 13*c* being as zero in time axis in which the maximum value is time for the deflection angle θ or scan angle α to reach the maximum amplitude (half of resonance cycle or ¼ cycle) and normalized to 1 and −1. In FIG. 4A the vertical axis indicates scan angle α (or deflection angle without the deflection angle conversion element 14), codes Ci1, Ct1 are characteristic curves of scan angle α. In FIG. 4B the vertical axis indicates scan speed (of spots S on the screen Sc) of the light beam P and codes Ci2, Ct2 are characteristic curves of scan speed. FIG. 4C is based on FIG. 4B and therein, the vertical axis indicates scan speed of the light beam P normalized by the maximum value and characteristic values Ci3, Ct3 are virtually the same as the Ci2, Ct2. The MEMS mirror (mirror portion 13*c* of the optical deflector 13) is rotated in the angle range of −7.5 to +7.5 degrees as described above, so that the deflection angle θ is changed between −15 to +15 degrees.

As apparent from FIG. 4A and the simulation results in FIG. 13, the scan angle α when the deflection angle conversion element 14 is used (curve Ci1) is larger than that when it is not used (curve Ct1). With the deflection angle conversion element 14, at the maximum amplitude of the mirror portion 13*c* being ±7.5 degrees, the scan angle α is about ±30 degrees (curve Ci1) at maximum, and a necessary distance from the image projector to the screen Sc to form an A4 size image will be about 240 mm, realizing a very close range projection. In contrast, without the deflection angle conversion element 14, the scan angle α is equal to the deflection angle θ of ±15 degrees (curve Ct1) at maximum, and the necessary distance will be about 560 mm.

As apparent from FIG. 4B, 4C, the scan speed is fastest at zero in the time axis, that is, at the scan angle α (deflection angle θ) being zero, and it decreases as the scan angle increases irrespective of the use of the deflection angle conversion element 14. Comparing the characteristic curves Ci2, Ci3 (with the deflection angle conversion element 14) and Ct2, Ct3 (without the deflection angle conversion element 14) respectively, Ci2, Ci3 show that longer time is taken for the same amount of change in the scan speed than Ct2, Ct3, and that means the scan speed in Ci2, Ci3 is considered to be constant in a longer time than that in Ct2, Ct3. With the deflection angle conversion element 14, a range of time in which a change in the scan speed is small is larger than that without the deflection angle conversion element 14, and constant velocity is achieved in that time range. Accordingly, with the deflection angle conversion element 14, it is possible to correct image deformation, equalize illuminance of a light beam, and reduce unevenness in brightness of an image.

Figure 5B:
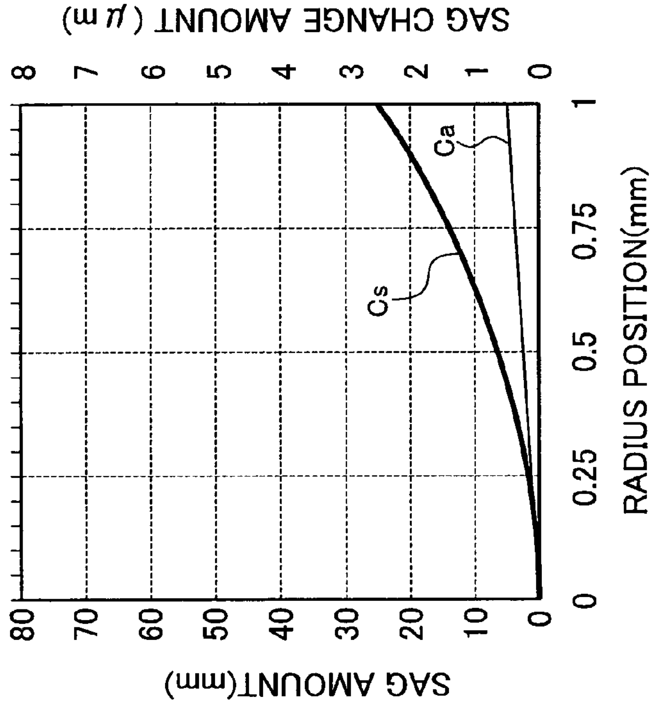
FIG. 5B is a graph showing the same on an exit face.
Figure 5A:
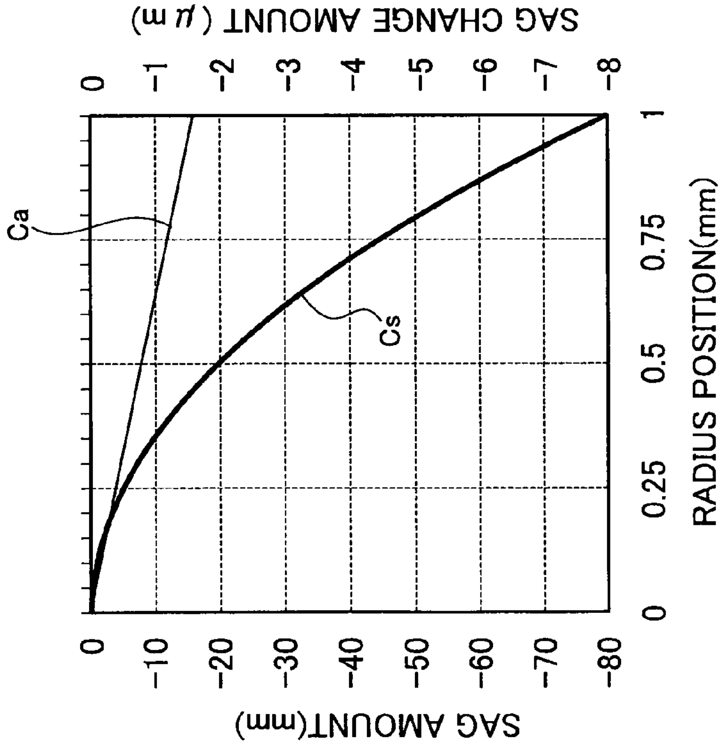
FIG. 5A is a graph showing a sag amount and a change in the sag amount on an incidence face relative to a radius from the optical axis of the deflection angle conversion element.

Next, the shapes of an incidence face 14*a* and an exit face 14*b* of the deflection angle conversion element 14 are described. The incidence and exit faces 14*a*, 14*b* are formed to be rotationally symmetric around the optical axis. FIG. 5A, 5B are graphs showing sag amount (mm) (characteristic curve Cs) and a change in sag amount (μm) (characteristic curve Ca) in vertical axes, and showing a radius (mm) from the optical axis of the deflection angle conversion element 14 in the horizontal axes. FIG. 5A shows characteristics of the incidence face 14*a* while FIG. 5*b* shows those of the exit face 14*b*. Note that the sag amount refers to z coordinates (incidence side: +, exit side: −) on the respective faces in the radius position when the optical axis direction is z-axis direction and coordinates on the optical axis in the z-axis direction is zero. Also, an amount of change refers to a change in the sag amount relative to unit change amount in radius direction, and is a first-order differential quantum of the characteristic curve Cs in the radius direction.

FIG. 5A, 5B show that the change amount (absolute value) increases from the optical axis to the periphery of the incidence and exit faces 14*a*, 14*b*. Forming the incidence face 14*a* in such a shape that the change amount increases from the optical axis to the periphery makes it possible for the deflection angle conversion element 14 to emit a light beam at a larger scan angle α as the incident position is away from the optical axis to the periphery. Moreover, by forming the incidence face 14*a* to be aspherical, the size of spots S on the screen Sc can be reduced. This holds true for the exit face 14*b*, and the exit face 14*b* formed in the above manner can achieve the same effects. With the deflection angle conversion element 14 in the first embodiment, the size of spots S can be 1 mm or less. However, with one having a flat lens face, for example, the size of spots S will be 3 mm or more, and a projected image will blur on the screen Sc.

Figure 7:
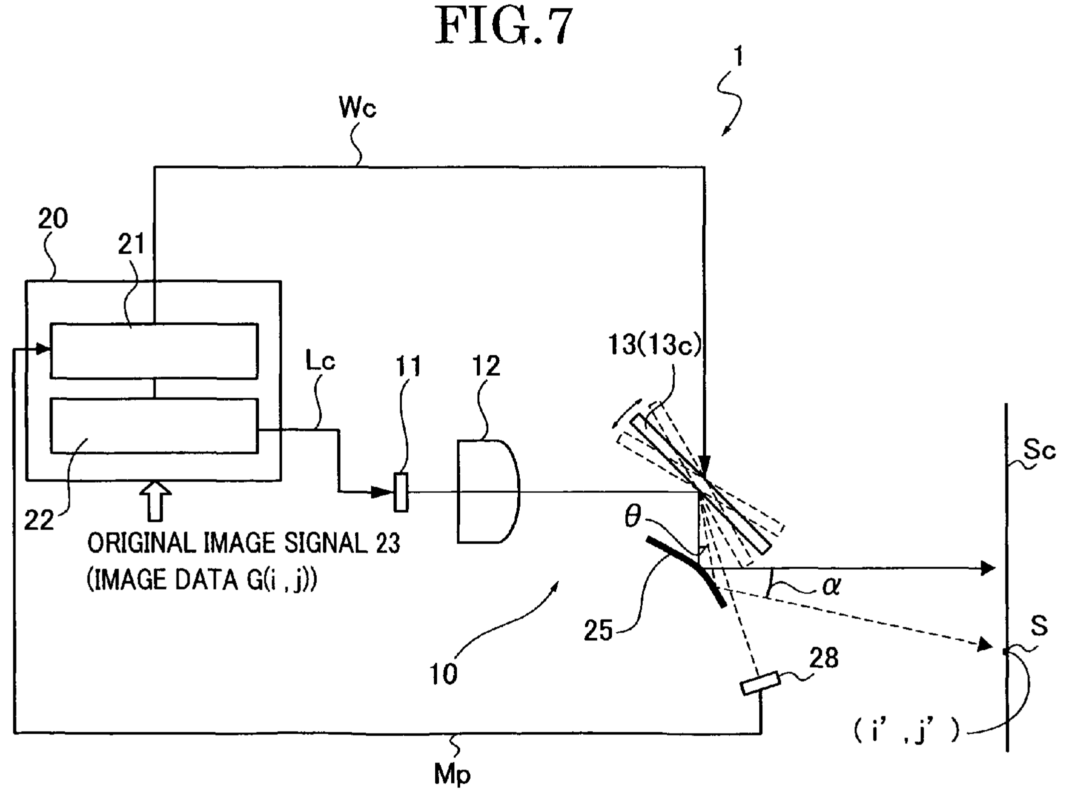
FIG. 7 schematically shows the image projector with a different reflective member from the ones in FIGS. 1 and 6.

As shown in FIG. 1, the control unit 20 comprises an optical deflector control unit 21 as a deflection angle control circuit and a light emission amount control unit 22 as a light source control circuit. The control unit 20 receives as an original image signal 23 image data G (i, j) which is image data at pixel position (i, j). In the control unit 20, the optical deflector control unit 21 properly controls the optical deflector 13 according to a mirror position signal Mp for synchronous detection, while the light emission amount control unit 22 controls the light source 11 according to the image data G(i, j) and the mirror position signal Mp. The optical deflector control unit 21 controls the optical deflector 13 by outputting a rotation control signal We while the light emission amount control unit 22 controls the light source 11 by outputting an emission control signal Lc. The mirror position signal Mp is a signal output from the optical deflector 13 and indicates a displacement of a vibrating mirror portion 13*c* in FIG. 1. When the optical deflector 13 is driven by an electromagnetic actuator, the mirror position signal Mp is obtained by detecting back EMF due to mirror vibration. When the optical deflector 13 is driven by a piezo actuator, the mirror position signal Mp is obtained by detecting back EMF generated in the piezo. Additionally, with provision of a light beam receiving element 28 in an appropriate position to receive a light beam deflected by the mirror portion 13*c*, the mirror position signal Mp can be obtained by using signals from the light receiving element 28 in association with a displacement of the mirror portion 13*c*, as shown in FIG. 7. Further, although not shown in the drawing, an electrode can be provided in a displacing portion (here, mirror portion 13*c*) as well as in a predetermined position not affected by the displacement to detect electrostatic capacitance varying with a displacement. In the first embodiment, the light emission amount control unit 22 controls the light source 11 in accordance with the control over the optical deflector 13 by the optical deflector control unit 21.

For example, for projecting a pixel as an i-th in the horizontal direction and a j-th in the vertical direction on the screen Sc, the light emission amount control unit 22 outputs a light emission amount control signal to the light source 11 in synchronization with the mirror position signal Mp, to emit a light beam in an amount for image data G(i, j) when the mirror portion 13*c* is inclined to form a spot S on the screen Sc at a position (i', j') corresponding to the pixel position (i, j). With use of an optical deflector which can be driven non-resonantly by a stepping motor or the like, the optical deflector control unit 21 outputs a drive control signal to the optical deflector in synchronization with the light emission amount control signal to form a spot S on the screen Sc at a position (i', j') corresponding to the pixel position (i, j).

Accordingly, the light source 11 emits a divergent light beam in amount for the image data G (i, j) to the divergent light conversion element 12 which converts the divergent light into convergent light, and emits it to the optical deflector 13.

The convergent light is deflected to the deflection angle conversion element in the horizontal and vertical directions 14 by the mirror portion 13*c* which is at an appropriate angle to form a spot S on the screen Sc at the position (i', j') in accordance with the pixel position. The deflection angle conversion element 14 converts the deflection angle θ of the incident convergent light into the scan angle α and emit it to the screen Sc as a projection plane. This forms a spot S in the position (i', j') on the screen Sc. The above operation is sequentially performed in scanning order based on all of image data G (i, j) on the original image signal 23 to thereby generate a two-dimensional image on the screen Sc in association with two-dimensional original image data.

As described above, with the use of the deflection angle conversion element 14, the optical scan unit 10 (image projector 1) can attain a large scan angle even when the deflection angle of the optical deflector 13 is small, and it can project a large image on a projection plane (screen Sc) in a close range. In the present embodiment, the scan angle α of the light beam can be ±30 degrees at maximum although the deflection angle θ of the optical deflector 13 is ±15 degrees at maximum. Therefore, it can project an image in A4 size in a projection range of about 240 mm.

Further, with the use of the deflection angle conversion element 14, the optical scan unit 10 (image projector 1) can maintain a constant scan speed in a certain range so that it can correct image deformation and unevenness in brightness more than one without the deflection angle conversion element 14.

Furthermore, the optical scan unit 10 (image projector 1) is very advantageous in terms of downsizing since it can achieve the above-mentioned effects with a simple structure including the deflection angle conversion element 14.

The optical scan unit 10 (image projector 1) is configured to increase the scan angle α with the deflection angle conversion element 14 so that the mirror portion 13*c* of the optical deflector 13 can be rotated stably for suppressing a decrease in resolution of a projected image. Also, it can efficiently utilize a light beam from the light source 11 without increasing manufacture and assembly precision of its parts and components, contributing to downsizing of the unit.

Further, the divergent light conversion element 12 can have an anamorphic aspherical face or a free-form curved face for the following reasons. Generally, intensity distribution of a light beam from a semiconductor laser is a Gaussian distribution, and a spread angle of the light beam is different in a parallel direction and a vertical direction relative to an active layer of the semiconductor laser. Because of this, the light beam through the rotationally symmetric divergent light conversion element 12 will be elliptic. However, provision of a beam shaping plate with a circular opening for shaping the elliptic beam may cause vignetting, leading to an increase in a loss of light, an extraneous power consumption, and degradation of projected images on the screen Sc due to the elliptic spots. This is why the divergent light conversion element 12 can include an anamorphic aspherical face or a free-form curved face which has different focal lengths in the horizontal and vertical directions relative to the active layer of the semiconductor laser. Thereby, it is possible to prevent a loss of light and form circular spots on the screen. Further, with the anamorphic aspherical face or free-form curved face having the same focal length, the shape of spots formed will be elliptic with a shorter length in the horizontal direction when the mirror is stationary, while it will be close to circular in a pixel due to afterimage effects in the scan direction when the mirror is in rotation.

Figure 6:
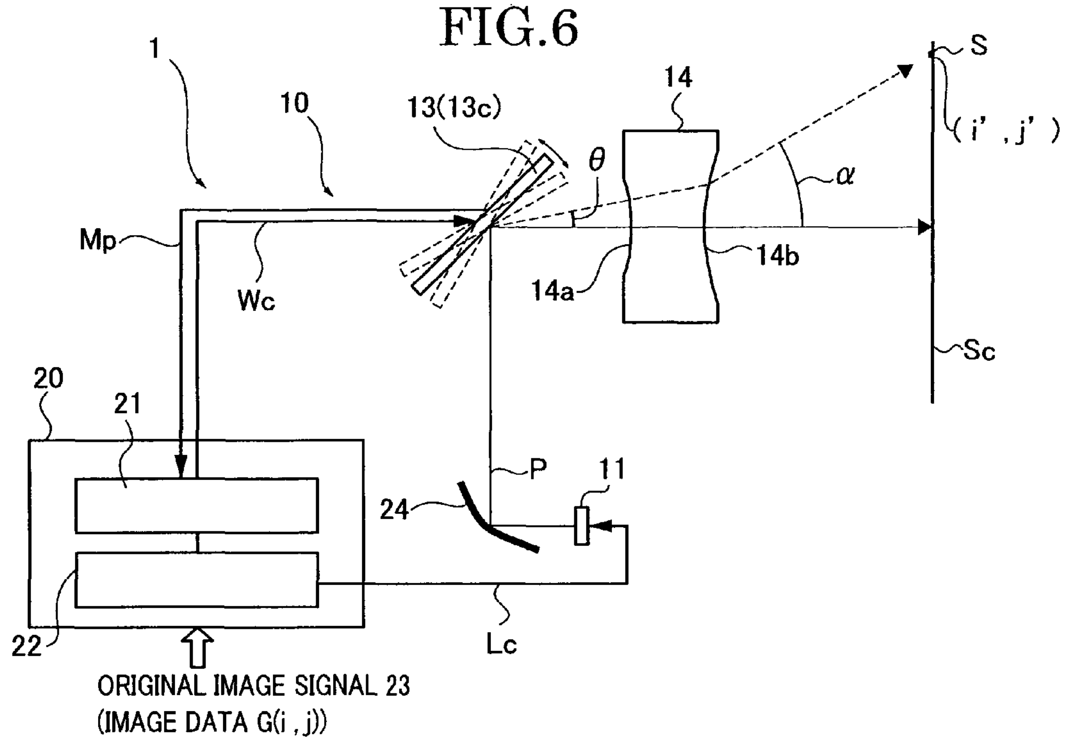
FIG. 6 schematically shows the image projector with a different reflective member from the one in FIG. 1.

The divergent light conversion element 12 can be replaced by a reflective element 24 in FIG. 6 since it only functions to convert light from the light source 11 to convergent light to form spots S on the screen Sc. The reflective element 24 has a free-form curved reflective face so that it can prevent a loss of light and form circular spots.

The deflection angle conversion element 14 can be also replaced by a reflective element 25 in FIG. 7 as long as the reflective element 25 can converts the deflection angle θ of a light beam deflected by the optical deflector 13 to a larger scan angle α. The reflective element 25 includes a free-form curved reflective face as the reflective element 24 does. The optical scan unit 10 (image projector 1) in FIG. 7 is configured to receive a light beam deflected by the mirror portion 13*c* with the light receiving element 28 for synchronous detection to generate mirror position signals Mp indicating the displacement of the mirror portion 13*c* in accordance with signals from the light receiving element 28, as described above.

Further, in a case where the deflection speed or amplitude of the optical deflector 13 differs in the horizontal and vertical directions, the divergent light conversion element 12 and the deflection angle conversion element 14 can be the above reflective elements with the anamorphic aspherical face or free-form curved face so as to differentiate amount of convergence or divergence of light for the horizontal and vertical directions in line with the deflection speed or amplitude of the optical deflector 13.

Modification of First Embodiment

Figure 14:
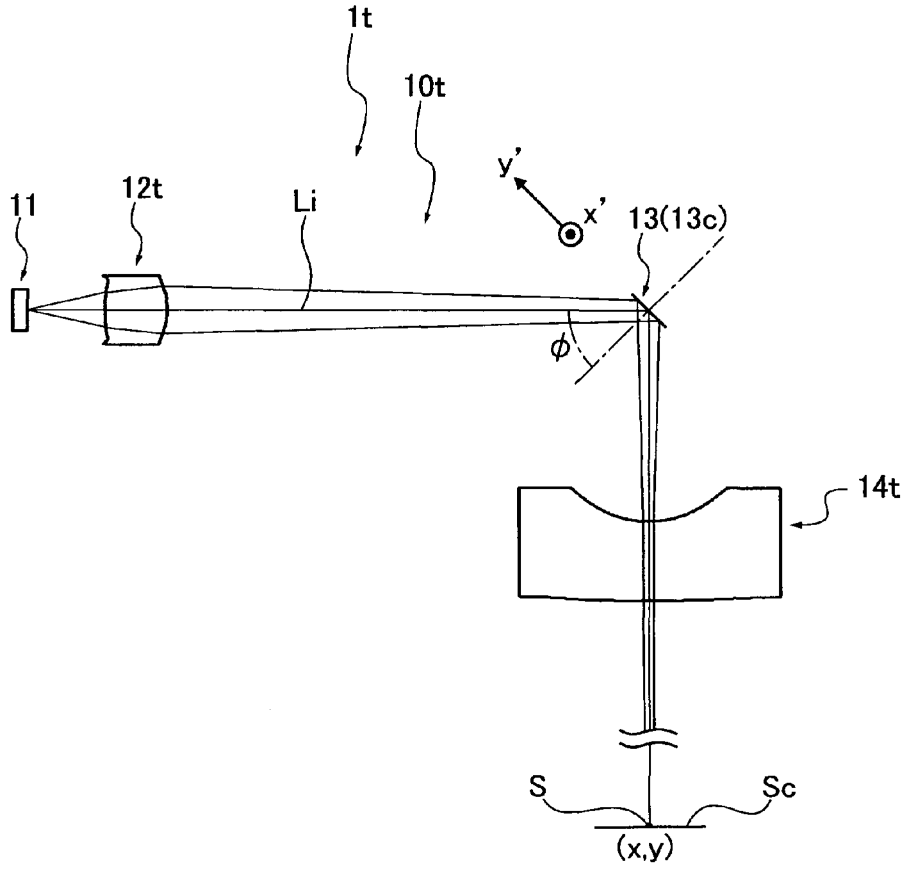
FIG. 14 schematically shows the structure of an optical scan unit of a modification of the image projector according to the first embodiment.

Next, a modification of the image projector according to the first embodiment is described. This modified embodiment uses an image projector 1*t* to find out through experiments how deformation of images on the screen Sc is changed in accordance with a change in the incidence angle ϕ of light on the mirror portion 13*c*. The structure of the image projector 1*t* is basically the same as that of the image projector 1 so that the same components and functions are given the same numeric codes as in the first embodiment, and a detailed description thereon is omitted. FIG. 14 schematically shows an optical scan unit 10*t* of the image projector 1*t* and optical paths at the incidence angle ϕ being 45 degrees.

Here, the incident optical axis Li refers to a traveling direction of a principal ray emitted from the light source 11 and transmitting through a divergent light conversion element 12*t*. The incidence angle ϕ refers to the angle of the incident optical axis Li relative to the normal line of the reflective face of the mirror portion 13*c* (optical deflector 13) which is in a reference position (stationary position).

As shown in FIG. 14, the optical scan unit 10*t* is the same as the optical scan unit 10 except for a divergent light conversion element 12*t* and a deflection angle conversion element 14*t*. Specifically, the light source 11 emits a light beam with a wavelength of 530 nm, the focal length of the divergent light conversion element 12*t* is set to 3.89 mm, and a distance from the light source 11 to the first face (facing the light source 11) of the divergent light conversion element 12*t* is 3 mm. The divergent light conversion element 12*t* is made of a glass material with refractive index $n_{CL}$ of 1.5196 and center thickness of 2.4 mm. A distance from the second face thereof to the reflective face of the optical deflector 13 is set to 18.354 mm and that from the reflective face of the optical deflector 13 to a first face (facing the optical deflector 13) of the deflection angle conversion element 14*t* is set to 8 mm. The deflection angle conversion element 14*t* is made of a glass material with the center thickness of 3 mm and refractive index $n_{EXP}$ of 1.5196. The optical system (optical scan unit 10*t*) is configured to focus a light beam from the light source 11 on a position which is 200 mm away from the second face (facing the screen Sc) of the deflection angle conversion element 14*t*.

Both of the faces of the divergent light conversion element 12*t* are aspherical and expressed by the above-mentioned formula (1). Data on the faces are shown in the following table 3.

TABLE 3

| | FIRST FACE | SECOND FACE |
|---|---|---|
| r | 11.048116 | −2.291852 |
| k | 0 | 0 |
| A | 5.82336E−03 | 9.26966E−03 |
| B | 2.88669E−02 | 4.76865E−03 |
| C | 7.12105E−02 | 3.75871E−03 |
| D | −6.67302E−02 | 1.78366E−03 |

Both faces of the deflection angle conversion element 14*t* are also aspherical and expressed by the above-mentioned formula (1). Data on the faces are shown in the following table 4.

TABLE 4

| | FIRST FACE | SECOND FACE |
|---|---|---|
| r | 3.810490 | 65.526384 |
| k | 0 | 0 |
| A | −3.78571E−04 | −5.10841E−05 |
| B | 7.74024E−06 | 1.31502E−05 |
| C | −2.79002E−05 | −9.19009E−07 |
| D | 4.40239E−07 | 1.33105E−08 |

With use of such an optical scan unit 10*t*, spots are formed on the screen Sc at incidence angles ϕ of 0, 15, 30, 45, 60, and 75 degrees under a predetermined condition. FIGS. 15A to 15F schematically show spot positions on the screen Sc. FIG. 16 shows how the spots are formed.

In the drawings the vertical direction is x-axis direction and the horizontal direction and y-axis direction, seen from the front. FIGS. 15A to 15F show positions where the spots S0 to S6 are formed at incidence angle ϕ of 0, 15, 30, 45, 60, and 75 degrees, respectively. For the sake of comparison, FIGS. 15A to 15F are shown in the same scale size.

The spots S0 to S6 are formed in the following manner. The mirror portion 13 of the optical deflector 13 is rotated (vibrated) around the two axes orthogonal to each other. One of the two axes is an x' axis and the other is a y' axis, and the x' axis is positioned in the same plane as the x axis of the screen Sc and the y' axis is positioned in the same plane as the y axis of the screen Sc (FIG. 16). The x' and y' axes are set so that the incidence angle ϕ is changed in a plane orthogonal to the x' axis (FIG. 14).

When the mirror portion 13*c* is rotated only around the x' axis, the position of the spot is changed only in the x-axis direction (indicated by a dashed line from the mirror portion 13*c* to the spot Sx in FIG. 16). When the mirror portion 13*c* is rotated only around the y' axis, the position of the spot is changed only in the y-axis direction (indicated by a two-dot chain line from the mirror portion 13*c* to the spot Sy in FIG. 16). In the xy coordinates of the screen Sc in FIGS. 15A to 15F, the rotations of the mirror portion 13*c* around the y' axis and x' axis which move spot positions in the x-axis direction and y-axis direction, respectively, are set to be +y' axis and +x' axis directions. The optical deflector 13 is disposed so that the pair of support shafts 13 supporting the inner frame 13*b* is to be the x' axis.

In FIGS. 15A to 15F, the spot S0 is formed with a light beam reflected by a stationary mirror portion 13*c* (0 degree around both the x' axis and y' axis). Similarly, the spot S1 to spot S6 are formed when the mirror portion 13*c* is rotated around the x' axis at +5 degrees and around the y' axis at +10 degrees, around the x' axis at +5 degrees and around the y' axis at 0 degree, around the x' axis at +5 degrees and around the y' axis at −10 degrees, around the x' axis at −5 degrees and around the y' axis at +10 degrees, around the x' axis at −5 degrees and around the y' axis at 0 degree, and around the x' axis at −5 degrees and around the y' axis at −10 degrees, respectively. Note that in the drawings the spots S1 to S6 are connected by straight lines to surround the spot S0 for better understanding of a difference in image deformation.

Figure 15A:
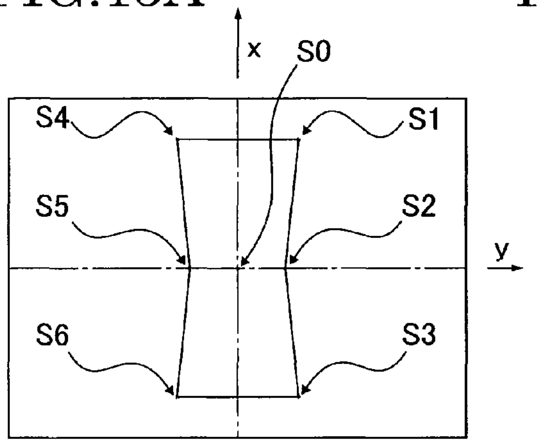
FIGS. 15A to 15F show spots on a screen formed by the modification of the image projector at incidence angles ϕ 0, 15, 30, 45, 60, 75 degrees, respectively.
Figure 15D:
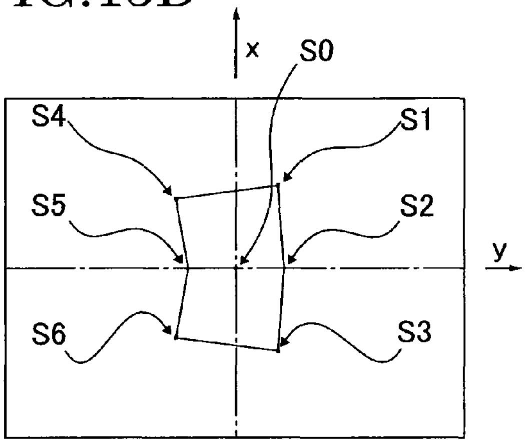
Figure 15B:
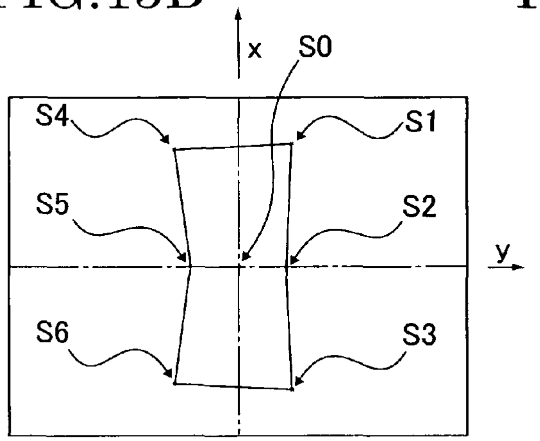
Figure 15E:
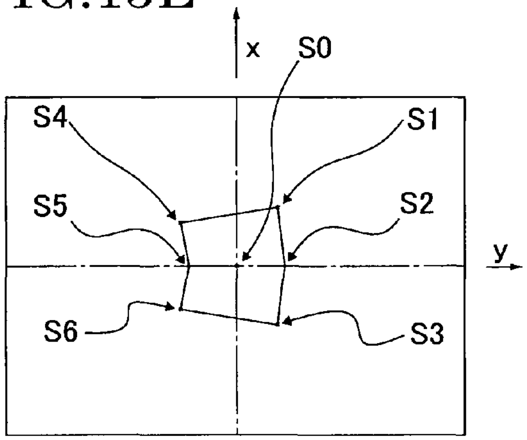
Figure 15C:
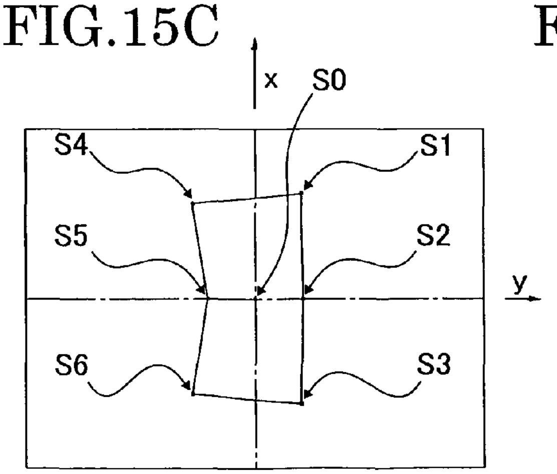
Figure 15F:
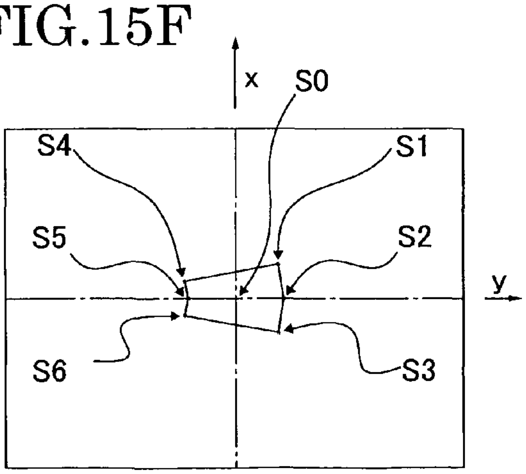
Figure 16:
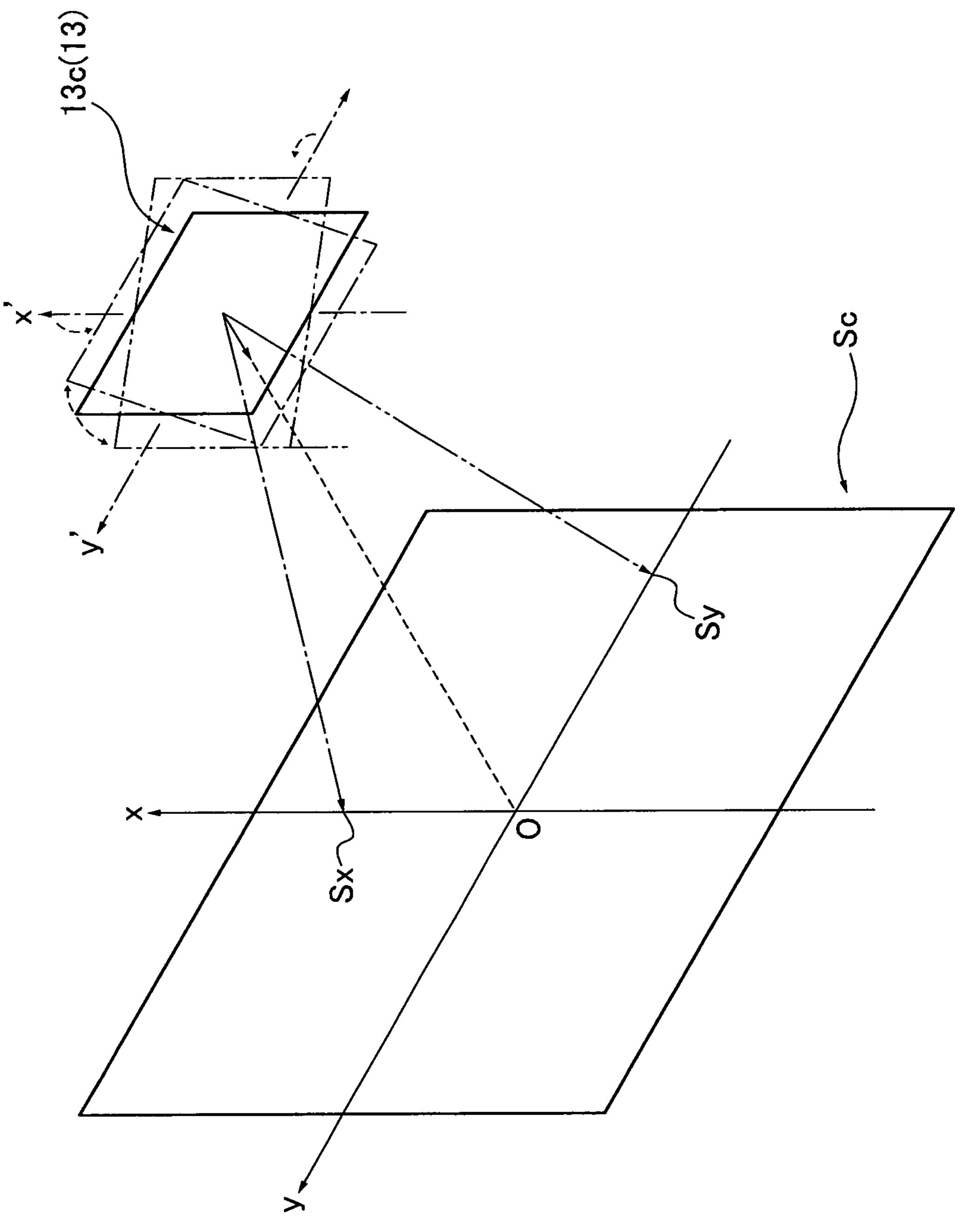
FIG. 16 shows how the spots in FIGS. 15A to 15F are formed.

At the incidence angle ϕ being 0 in FIG. 15A, the mirror portion 13*c* is in the stationary position and it faces the screen Sc so that deformation of a projected image due to the incidence angle ϕ is to be smallest. As obvious from FIGS. 15A to 15 F, the larger the incidence angle ϕ, the larger the deformation of images on the screen Sc. Specifically, the positions of the spots are substantially the same in the y-axis direction irrespective of the incidence angle ϕ. To the contrary, with regard to the positions of the spots in the x-axis direction, the larger the incidence angle ϕ, the smaller the change amount of the spot positions relative to the rotation of the mirror portion 13*c* around the y' axis. In changing the incidence angle ϕ in the plane orthogonal to the x' axis in the optical scan unit 10*t*, as the incidence angle ϕ increases, a projected image is deformed to shrink (cosine ϕ times smaller) in the x-axis direction according to the value of ϕ since the amplitude of light will be about cosine ϕ times larger in a substantially vertical direction (y' axis rotation direction of the mirror portion 13*c* and x-axis direction on the screen Sc).

Therefore, to form an image in a predetermined size, at a larger incidence angle ϕ, it is necessary to increase the amplitude of the mirror portion 13*c* (around the y axis). But, that is very hard to achieve. For this reason, it is advantageous to convert the deflection angle θ of a light beam deflected by the optical deflector 13 into a larger scan angle α by the use of the deflection angle conversion element 14*t* as in present embodiment.

The incidence angle ϕ should be preferably set to a very small value at or close to zero for generation of images of a desirable size, even with use of the deflection angle conversion element 14*t*. This however requires for the optical scan unit to include a beam splitter (later-described in a fifth embodiment), which brings increases in the number of parts and components and manufacture costs as well as a decrease in the degree of freedom of parts arrangements. As described above, however, at the incidence angle ϕ of 45 degrees, about 70% size of an image in comparison with that at the incidence angle ϕ of 0 can be formed since the size of the image formed is cosine ϕ times smaller as the incidence angle ϕ increases. In this manner, it is possible to form images in a size close to a desirable size without the beam splitter.

In FIGS. 15A to 15F, the absolute values of the coordinates of the spots S1 to S3 are different from those of the spots S4 to S6 in the y-axis direction on the screen Sc because a difference in the rotation angle of the mirror portion 13*c* around the x' axis affects beam positions virtually the same as a difference in the incidence angle ϕ. Moreover, in the optical scan unit 10*t* the deflection angle conversion element 14*t* is inserted on the optical path, so that the amount of deformation is far from a cosine p times larger value relative to the incidence angle ϕ. However, in a simulation without the deflection angle conversion element 14 on the optical path, it becomes very close to the larger value. An example of this simulation is shown in the following table 5. The following table 5 shows x coordinates of spots S on the screen Sc at the incidence angle ϕ of 0, 15, 30, 45, 60, and 75 degrees when the mirror portion 13*c* is rotated only around the y' axis at 10 degrees (0 degrees around the x' axis). Note that values in parenthesis in the table 5 is obtained by multiplying x coordinates (least deformation due to incidence angle) at the incidence angle ϕ of 0 degrees by cosine ϕ. Also, the mirror portion is not rotated around the x' axis; therefore, y coordinates are always zero (on the x-axis).

TABLE 5

| | INCIDENCE ANGLE Φ | | | | | |
|---|---|---|---|---|---|---|
| | 0° | 15° | 30° | 45° | 60° | 75° |
| WITH DEFLECTION ANGLE CONVERSION ELEMENT 14t | 174.0 | 164.4 (168.1) | 140.4 (150.7) | 109.1 (123.0) | 73.8 (87.0) | 36.9 (45.0) |

TABLE 5-continued

| | INCIDENCE ANGLE Φ | | | | | |
|---|---|---|---|---|---|---|
| | 0° | 15° | 30° | 45° | 60° | 75° |
| WITHOUT DEFLECTION ANGLE CONVERSION ELEMENT 14t | 76.8 | 73.9 (74.2) | 65.5 (66.5) | 52.6 (54.3) | 36.6 (38.4) | 18.8 (19.9) |

Second Embodiment

Next, an image projector 1A according to the second embodiment is described with reference to FIG. 8. The image projector 1A is a color image projector and the structure thereof is basically the same as that of the image projector 1 in the first embodiment, so that the same functions and components are given the same numeric codes and a detailed description thereon is omitted.

The image projector 1A includes an optical scan unit 10A comprising three light sources 11*a*, 11*b*, 11*c* and three divergent light conversion elements 12*a*, 12*b*, 12*c*. The light sources 11*a*, 11*b*, 11*c* are monochromatic light sources of red, green, blue, respectively for color image projection. Using such monochromatic lights, the image projector 1A is able to generate bright color images with high color purity. The monochromatic light sources can be lasers with proper wavelengths. In the second embodiment, the light source 11*a* is a semiconductor laser with a wavelength 638 nm for red light, the light source 11*b* is a semiconductor laser with a wavelength 1060 nm for green light and uses the second harmonic of 560 nm, and the light source 11*c* is a semiconductor laser with a wavelength 445 nm for blue light. The divergent light conversion elements 12*a*, 12*b*, 12*c* which function the same as that 12 in the first embodiment are provided to focus light beams from the light sources to be convergent light, and they have the same aspherical faces.

The optical scan unit 10A is configured to include optical path combiner units 16*a*, 16*b* on an optical path from the divergent light conversion element 12*a* to the optical deflector 13 to combine light beams emitted from the light sources 11*a*, 11*b*, 11*c* and passing through the divergent light conversion elements 12, 12*b*, 12*c* into one.

In the present embodiment, the optical path combiner unit 16 is made of a dielectric multi-layer filter and has a characteristic of reflecting light in a predetermined wavelength range and having light outside the wavelength range transmitted therethrough. The optical path combiner unit 16*a* corresponding to the light source 11*b* reflects 95% more of green light with a wavelength range 510 nm to 570 nm and transmits 90% more of light with a wavelength range other than this range. The optical path combiner unit 16*b* corresponding to the light source 11*c* reflects 95% more of blue light with a wavelength range 400 nm to 490 nm and transmits 90% more of light with a wavelength range other than this range.

In the image projector 1A, the light sources 11*a*, 11*b*, 11*c* emit light beams appropriately under the control of the control unit 20 (light emission amount control unit 22). A light beam from the red light source 11*a* is converted into convergent light by the divergent light conversion element 12*a*, and transmits through the optical path combiner units 16*a*, 16*b* to the optical deflector 13. The optical path of this beam light is set to be a reference optical path Pb. A light beam from the green light source 11*b* is converted into convergent light by the divergent light conversion element 12*b*, reflected by the optical path combiner unit 16*a* on the reference optical path Pb and transmits through the optical path combiner unit 16*b* to the optical deflector 13. A light beam from the blue light source 11*c* is converted into convergent light by the divergent light conversion element 12*c*, and reflected by the optical path combiner unit 16*b* on the reference optical path Pb to the optical deflector 13.

Thus, light beams emitted from the light sources 11*a*, 11*b*, 11*c* are converted into convergent lights by the divergent light conversion elements 12*a*, 12*b*, 12*c*, respectively, combined by the optical path combiner units 16*a*, 16*b* and directed to the optical deflector 13.

The combined light beam is deflected by the optical deflector 13 at the deflection angle θ, converted into one at the scan angle α larger than deflection angle θ by the deflection angle conversion element 14 and forms spots S on the screen Sc as in the image projector 1 of the first embodiment. The mirror portion 13*c* of the optical deflector 13 is driven under the control of the control unit 20 (optical deflector control unit 21) to reflect the convergent light and two dimensionally change the traveling direction (deflection angle θ) thereof, thereby two-dimensionally forming spots on the screen Sc. For optical scanning, emission timing, light intensity, and emission period of the light sources 11*a*, 11*b*, 11*c* are properly controlled based on image data (image data G (i, j) at each pixel (i, j)) to generate color images on the screen Sc.

The image projector 1A according to the present embodiment can emit a light beam at a large scan angle even with the optical deflector 13 having a small deflection angle, as the image projector 1 according to the first embodiment. Because of this, it can project images in a very close range and maintain the constant scan speed in a predetermined range to correct image deformation or unevenness in brightness.

Further, the image projector 1A includes the monochromatic light sources 11, 11*b*, 11*c* so that it can form color images in high contrast and with high color purity. In addition, the image projector 1A is configured to directly render each pixel, and render pixels (i, j) according to black image data G (i, j) without light emission from the laser. It can prevent a black portion of an image from becoming too bright and improve image contrast in comparison with an image projector using a micro display such as liquid crystal.

Further, according to the image projector 1A of the present embodiment, the divergent light conversion elements 12*a*, 12*b*, 12*c* are formed in the same aspheric shape. However, the present invention is not limited thereto. They can be optimally designed to have different focal lengths or shapes from each other in accordance with divergent light of the second harmonic wave of the semiconductor laser to form desirable spots on the screen Sc with the light beam from the monochromatic light sources.

Modification of Second Embodiment

Figure 17:
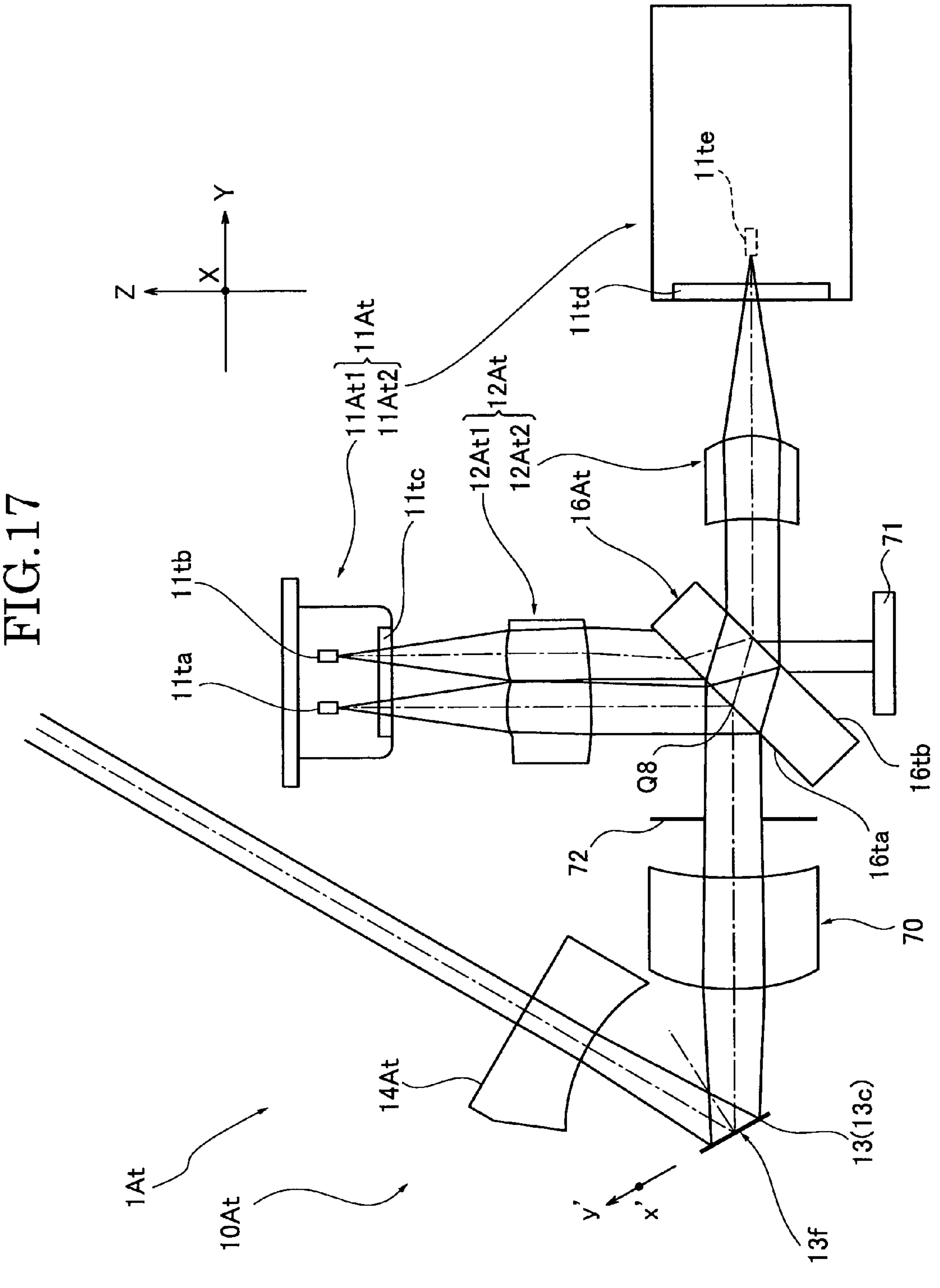
FIG. 17 schematically shows the structure of an optical scan unit of a modification of the image projector according to the second embodiment.
Figure 18:
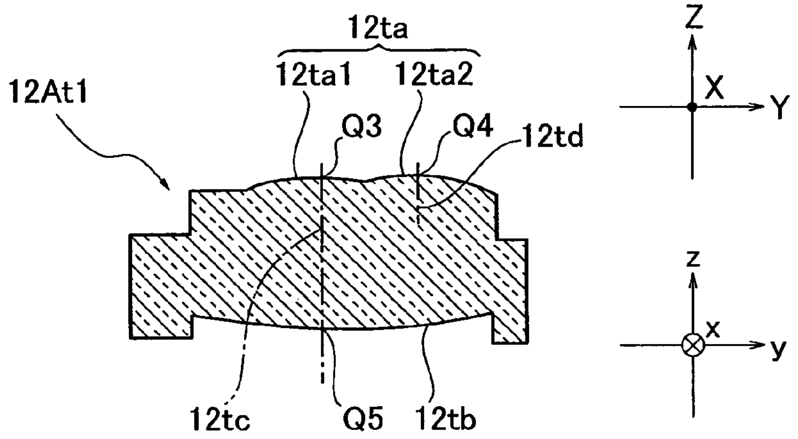
FIG. 18 is a cross sectional view of a first divergent light conversion element of the modification of the image projector (optical scan unit) according to the second embodiment.
Figure 19:
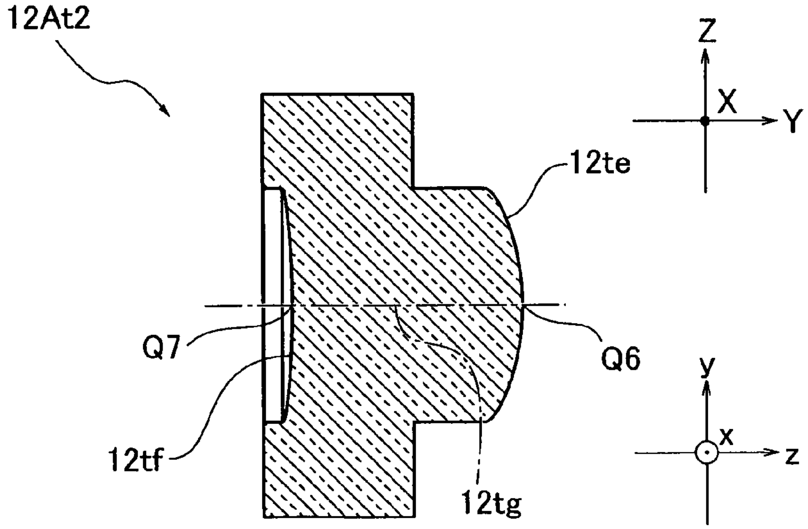
FIG. 19 is a cross sectional view of a second divergent light conversion element of the modification of the image projector (optical scan unit) according to the second embodiment.
Figure 20:
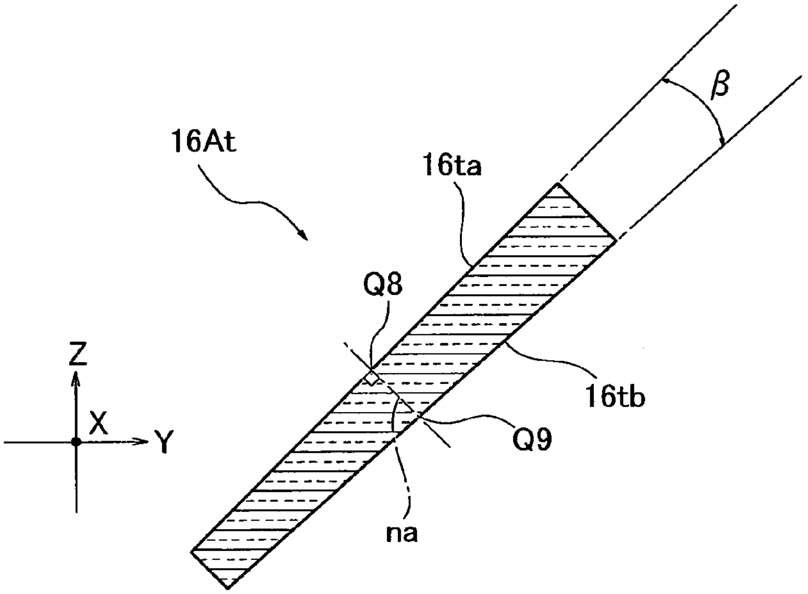
FIG. 20 is a cross sectional view of an optical path combiner unit of the modification of the image projector (optical scan unit) according to the second embodiment.
Figure 21:
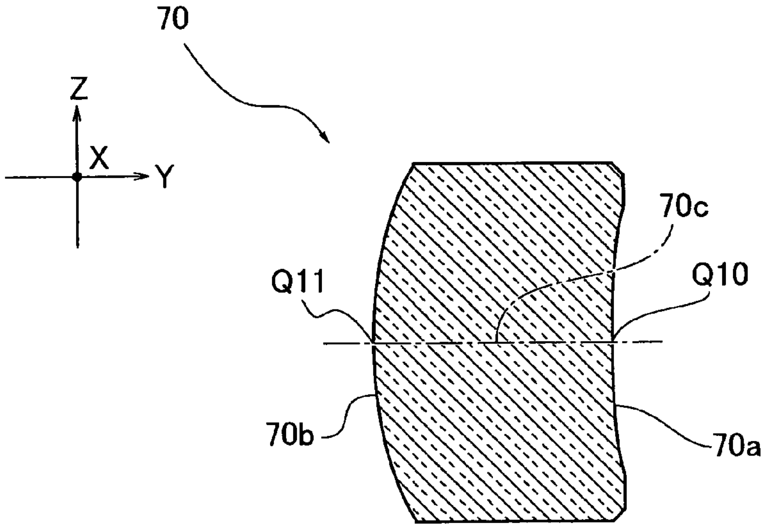
FIG. 21 is a cross sectional view of a focus lens of the modification of the image projector (optical scan unit) according to the second embodiment.
Figure 22:
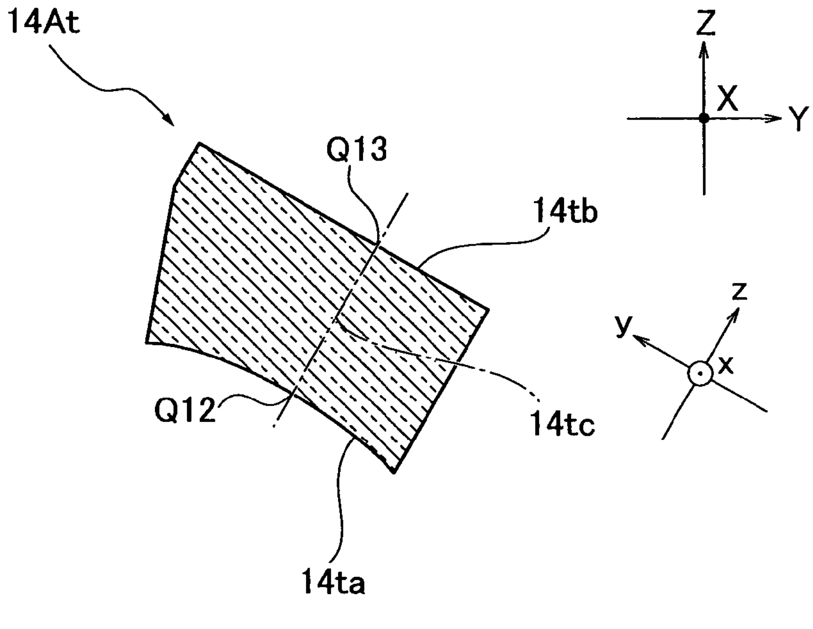
FIG. 22 is a cross sectional view of a deflection angle conversion element of the modification of the image projector (optical scan unit) according to the second embodiment.

Next, an image projector 1At (optical scan unit 10At) as a modification of the image projector 1A is described with reference to FIGS. 17 to 22. The image projector 1At (optical scan unit 10A) is another example of a color image projector in a smaller size. The structure thereof is basically the same as that of the image projector 1A in the second embodiment, so that the same functions and components are given the same numeric codes and a detailed description thereon is omitted. FIG. 17 schematically shows the structure of the image projector 1At but omits showing the control unit 20 for simplicity. FIG. 18 shows the cross section of a first divergent light conversion element 12At1 used in the image projector 1At, FIG. 19 shows the cross section of a second divergent light conversion element 12At2, FIG. 20 shows the cross section of an optical path combiner unit 16At, FIG. 21 shows the cross section of a focus lens 70, and FIG. 22 shows the cross section of a second divergent light conversion element 12At2. In the following, the optical axis direction (principal ray) of an optical path of each optical element is set to be a Z axis. In FIGS. 17 to 22, however, an exit optical axis direction of a first light source 11At1 of the light source 11At is set to be a Z axis, a direction orthogonal to the Z axis is set to be a Y axis, and a direction orthogonal to both axes is set to be an X axis. Also, in FIGS. 18 to 22, the optical axis direction of each optical element is set to be a z axis, a direction orthogonal to the drawings is set to be an x axis, and a direction orthogonal to an x-z plane is set to be a y axis. In the following, the positional relation and structure of the image projector 1At will be described using an orthogonal coordinate system of X, Y, Z axes (hereinafter, global axes) while the structure (lens data or the like) of each optical element will be described using an orthogonal coordinate system of x, y, z axes (hereinafter, local axes).

The optical scan unit 10At of the image projector 1At is configured to include first and second light source devices 11At1, 11At2 and first and second divergent light conversion elements 12At1, 12At2 as shown in FIG. 17.

The first light source device 11At1 is a hybrid laser (HBLD) in which a semiconductor laser chip 11*ta* (first light source) with a center wavelength of 640 nm (hereinafter, red LD chip) and a semiconductor laser chip 11*tb* (second light source) with a center wavelength of 445 nm (hereinafter, blue LD chip) are arranged in the Y-axis direction on a single package. In the first light source device 11At1, a distance between a light emitting point of the red LD chip 11*ta* and that of the blue LD chip 11*tb* (between both of the exit optical axes) is set to 0.9 mm. The positions of the light source device 11At1 and the first divergent light conversion element 12At1 are determined so that the exit optical axis of the red LD chip 11*ta* coincides with an optical axis 12*tc* of a later-described first lens face 12*ta*1 of the first divergent light conversion element 12At1 as well as the exit optical axes of the red and blue LD chips 11*ta*, 11*tb*, the optical axis 12*tc*, an optical axis 12*td* of a second lens face 12*ta*2 of the first divergent light conversion element 12At1 are placed in the same plane. Light beams (linearly polarized divergent light) from the red and blue LD chips 11*ta*, 11*tb* transmit through a cover glass 11*tc* and are directed to the first divergent light conversion element 12At1.

The first divergent light conversion element 12At1 is made of a glass material with refractive indexes of $n_{640}$=1.506643, $n_{445}$=1.519219, and functions to make light beams from the red and blue LD chips 11*ta*, 11*tb* into substantially parallel light beams. As shown in FIG. 18, the first divergent light conversion element 12At1 includes a first face 12*ta* facing the first light source 11At1 and a second face 12*tb* facing a later-described optical path combiner unit 16At.

The first face 12*ta* of the first divergent light conversion element 12At1 includes a first lens face 12*ta*1 and a second lens face 12*ta*2. The first lens face 12*ta*1 is a rotationally symmetric aspheric face and functions to couple divergent light from the red LD chip 11*ta*. The rotationally symmetric aspheric face can be expressed by the above formula (1) in the orthogonal coordinate system (the arrows x, y, z in FIG. 18) where a point Q3 on the optical axis 12*tc* (rotation axis) of the first lens face 12*ta*1 is an origin point, a direction from a later-described optical path combiner unit 16At to the red LD chip 11*ta* is +z axis, a right side of a horizontal direction in FIG. 18 is +y axis, and a direction from the front to the back of the drawing and orthogonal to the z and y axes is +x axis. Data on the lens face 12*ta*1 is shown in the following table 6.

TABLE 6

| FIRST LENS FACE 12ta1 | |
|---|---|
| r | −1.8945 |
| k | −1.36684 |
| A | 4.36388E−03 |
| B | 8.23972E−02 |
| C | −5.41640E−01 |
| D | 2.06620E+00 |
| E | −3.32445E+00 |
| F | 5.71337E−01 |
| G | 4.54194E+00 |
| H | −5.06044E+00 |
| J | 1.67894E+00 |

The second lens face 12*ta*2 is a rotationally asymmetric anamorphic aspheric face and functions to couple divergent light from the blue LD chip 11*tb*. A distance z (sag amount of a plane parallel to the z axis) of the anamorphic aspheric face in the x-y plane in the optical axis direction is expressed by the following formula (2) in the orthogonal coordinate system (the arrows x, y, z in FIG. 18) where a point Q4 on the optical axis 12*td* (rotation axis) of the second lens face 12*ta*2 is an origin point, and a direction from a later-described optical path combiner unit 16At to the blue LD chip 11*tb* is +z axis.

Formula (2)

$$z = \frac{CUXx^2 + CUYy^2}{1 + SQRT\{1 - (1+KX)CUX^2x^2 - (1+KY)CUY^2y^2\}} + AR\{(1-AP)x^2 + (1+AP)y^2\}^2 + BR\{(1-BP)x^2 + (1+BP)y^2\}^3 + CR\{(1-CP)x^2 + (1+CP)y^2\}^4 + DR\{(1-DP)x^2 + (1+DP)y^2\}^5 \quad (2)$$

where CUX represents curvature (=1/RDX where RDX is curvature radius in x direction) in the x direction, CUY represents curvature (=1/RDY where RDY is curvature radius in y direction) in the y direction, KX represents a conic coefficient in the X direction, KY represents a conic coefficient in the Y direction, AR, BR, CR, DR are deformation coefficients and forth, sixth, eighth, tenth orders rotational symmetric parts, respectively, and AP, BP, CP, DP, are deformation coefficients and forth, sixth, eighth, tenth orders rotational asymmetric parts, respectively.

Each coefficient of the formula (2) is shown in the following table 7. In the table 7 "E-0$n$" signifies "$10^{-n}$"

TABLE 7

| SECOND LENS FACE 12ta2 | |
|---|---|
| RDY | −1.87285 |
| RDX | −1.88279 |
| KY | −2.47171 |
| KX | −3.14941 |
| AR | −2.70533E−06 |
| BR | 1.12256E−02 |
| CR | 1.69715E−02 |

TABLE 7-continued

| | SECOND LENS FACE 12ta2 |
|---|---|
| D R | −2.43464E−13 |
| A P | −3.06876E+01 |
| B P | 2.54510E−01 |
| C P | −7.31530E−02 |
| D P | 1.99910E+02 |

The second face 12*tb* of the first divergent light conversion device 12At1 is a rotationally symmetric aspheric face and its rotation axis coincides with the optical axis 12*tc* of the first lens face 12*ta*1 of the first face 12*ta*. The rotationally symmetric aspheric face is expressed by the above formula (1) in the orthogonal coordinate system (x, y, z in FIG. 18) where a point Q5 on the optical axis 12*tc* (rotation axis) of the second face 12*tb* is an origin point, and a direction from the later-described optical path combiner unit 16At to the first light source device 11At1 is +z axis. Data on the second face 12*tb* is shown in the following table 8.

TABLE 8

| | SECOND FACE 12Atb |
|---|---|
| r | 6.72201 |
| k | −96.775174 |
| A | 1.73436E−02 |
| B | −3.73549E−03 |
| C | −8.57595E−05 |
| D | 4.33127E−05 |
| E | 4.29861E−05 |
| F | 1.57947E−05 |
| G | −1.02243E−05 |
| H | 2.68002E−07 |
| J | 7.83204E−08 |

The thickness (from Q3 to Q5 on the optical axis 12*tc*) of the first lens face 12*ta*1 is 1.5 mm and that (from Q4 to Q5 on the optical axis 12*td*) of the second lens face 12*ta*2 is 1.5 mm. The distance between the optical axis 12*tc* of the first lens face 12*ta*1 and the optical axis 12*td* of the second lens face 12*ta*2 is 0.93 mm in the y-axis direction. The optical axes 12*tc*, 12*td* are placed in the Y-Z plane (global axis). In FIG. 17, a second light source 11At2 is provided to emit light for color image projection together with the two substantially parallel lights converted by the first divergent light conversion element 12At1.

The second light source device 11At2 (third light source) is a semiconductor laser with a center wavelength of 1060 nm and emits a SHG laser beam with a center wavelength of 530 nm converted. A light beam from an exit point (virtual emitting point 11*te*) of the second light source device 11At2 transmits through a cover glass 11*td* and is directed to a second divergent light conversion element 12At2.

The second divergent light conversion element 12At2 is made of a glass material with a refractive index $n_{530}$=1.51199 at a wavelength of 530 nm and functions to make a light beam from the second light source device 11At2 into substantially parallel light beams. As shown in FIG. 19, it has a first face 12*te* (third lens face) facing the second light source 11At2 and a second face 12*tf* facing the optical path combiner unit 16At.

The first and second faces 12*te*, 12*tf* thereof are rotationally symmetric aspheric faces having the same optical axis 12*tg* (rotation axis). The first face 12*te* is expressed by the above formula (I) in the orthogonal coordinate system (x, y, z in FIG. 19) where a point Q6 on the optical axis 12*tg* is an origin point, a direction from the optical path combiner unit 16At to the second light source 11At2 is +z axis, and the upper side of the vertical direction in FIG. 19 is +y axis and a direction from the front to the back of the drawing and orthogonal to z and y axes is +x axis. Similarly, the second face 12*tf* is expressed by the above formula (1) in the orthogonal coordinate system (x, y, z in FIG. 19) where a point Q7 on the optical axis 12*tg* is an origin point, a direction from the optical path combiner unit 16At to the second light source device 11At2 is +z axis. Data on the first and second faces is shown in the following table 9.

TABLE 9

| | FIRST FACE 12te | SECOND FACE 12tf |
|---|---|---|
| r | −16.1264 | −1.44657 |
| k | 117.47157 | −1.588621 |
| A | −8.65693E−02 | −6.15995E−02 |
| B | −4.93648E−02 | −7.53448E−03 |
| C | 5.92904E−02 | 1.25281E−02 |
| D | −1.72890E−01 | −3.16739E−02 |

The thickness of the second divergent light conversion element 12At2 from Q7 to Q8 on the optical axis 12*tg* is 1.5 mm. As shown in FIG. 17, the optical path combiner unit 16At is provided to combine light beams with different wavelengths from the second and first divergent light conversion element 12At2, 12At1 into one. Thereby, the combined light transmits through the focus lens 70 and is directed to the optical deflector 13 for scanning. The optical path combiner unit 16At is a plate-like prism as shown in FIG. 20, and includes a first face 16*ta* facing the first divergent light conversion element 12At1 and a second face 16*tb* facing the second divergent light conversion element 12At2.

Normal line (na) of the first face 16*ta* and that of the second face 16*tb* are non-parallel in the same plane and a cross section of the optical path combiner unit 16At along the same plane is in a wedge shape. A vertex angle β of the wedge shape is set to 0.8 degree. The first and second faces 16*ta*, 16*tb* each have a film with wavelength selective characteristic. In this modified embodiment the film of the first face 16At has reflectivity of 95% and transmittance of 5% relative to light with wavelength of 640 nm±10 nm at incidence angle of 45±1.5 degrees, transmittance of 99% or more relative to light with wavelength of 530 nm±5 nm at incidence angle of 45±1.5 degrees, and transmittance of 99% or more relative to light with wavelength of 445 nm+10 nm/−5 nm at incidence angle of 46.5±2.5 degrees, for example. The film of the second face 16*tb* has transmittance of 99% or more relative to light with wavelength of 640 nm±10 nm at incidence angle of 43.5±1.5 degrees, transmittance of 95% relative to light with wavelength of 530 nm±5 nm at incidence angle of 46.5±1.5 degrees, and transmittance of 5% relative to light with wavelength of 445 nm+10 nm/−5 nm at incidence angle of 46.5±1.5 degrees. The films of the first and second faces 16*ta*, 16*tb* are set to transmit about 5% of amount of light beams with three wavelengths from the first and second divergent light conversion elements 12At1, 12At2 (to a later-described light receiving element 71 in FIG. 17).

The optical path combiner unit 16At is made of a glass material with refractive indexes $n_{640}$=1.514846, $n_{530}$=1.519584, $n_{445}$=1.525786. In FIG. 20, the optical center of the first face 16*ta* is a point Q8 and an intersection of the normal line na thereof on the point Q8 and the second face 16*tb* is a point Q9.

The point Q8 is positioned on the optical axis 12*tc* (Z-axis direction in FIG. 18) of the first lens face 12*ta*1 of the first face 12*ta* of the first divergent light conversion element 12At1. The optical axis 12*tc* makes a 45 degree angle with the first face 16*ta* of the optical path combiner unit 16At which is perpendicular to a plane including the optical axes 12*tc*, 12*td* (Y-Z plane (global axis) in FIG. 17, 18). The center thickness of the optical path combiner unit 16At (between Q8 and Q9) is set to 1.1 mm.

Accordingly, the light beam from the red LD chip 11*ta* is coupled by the first divergent light conversion element 12At1 to linearly polarized divergent light. Then, the principal ray is incident on the point Q8 of the first face 16*ta* at incidence angle 45 degrees, and reflected thereby to the focus lens 70. The optical path of the reflected light is a single optical path of a combined light beam (later described) from the focus lens 70 to the optical deflector 13. As described above, about 5% of amount of the light beam coupled by the first divergent light conversion element 12At1 transmits through the optical path combiner unit 16 and travels to a later-described light receiving element 71.

The light beam from the blue LD chip 11*tb* is coupled by the first divergent light conversion element 12At1 to linearly polarized divergent light, incident on the first face 16*ta* and reflected by the second face 16*tb* to the first face 16*ta* again, and combined with the other light beams. As described above, about 5% of amount of the light beam from the first divergent light conversion element 12At1 transmits through the optical path combiner unit 16At and travels to the later-described light receiving element 71.

Similarly, the light beam from the second light source device 11At2 is coupled by the second divergent light conversion element 12At2 to linearly polarized divergent light, incident on the second face 16*tb* to the first face 16*ta*, and combined with the other light beams. As described above, about 5% of amount of the light beam from the second divergent light conversion element 12At2 is reflected by the second face 16*tb* of the optical path combiner unit 16At to the later-described light receiving element 71.

The light beam (laser beam) with the three wavelengths combined by the optical path combiner unit 16At transmits through an aperture element 72 and is directed to the focus lens 70. The aperture element 72 includes an opening in a smaller size that that of the mirror portion 13*c* of the optical deflector 13 to prevent a light beam from being incident on other portions than the mirror portion 13*c*. In this modified example, the diameter of the opening of the aperture element 72 is set to 0.96 mm and the center thereof coincides with the axis of the optical path (principal ray of the combined light beam). The aperture element 72 can prevent occurrence of flare due to light incident on a portion other than the mirror portion 13*c* which may cause degradation of color image quality.

Figure 8:
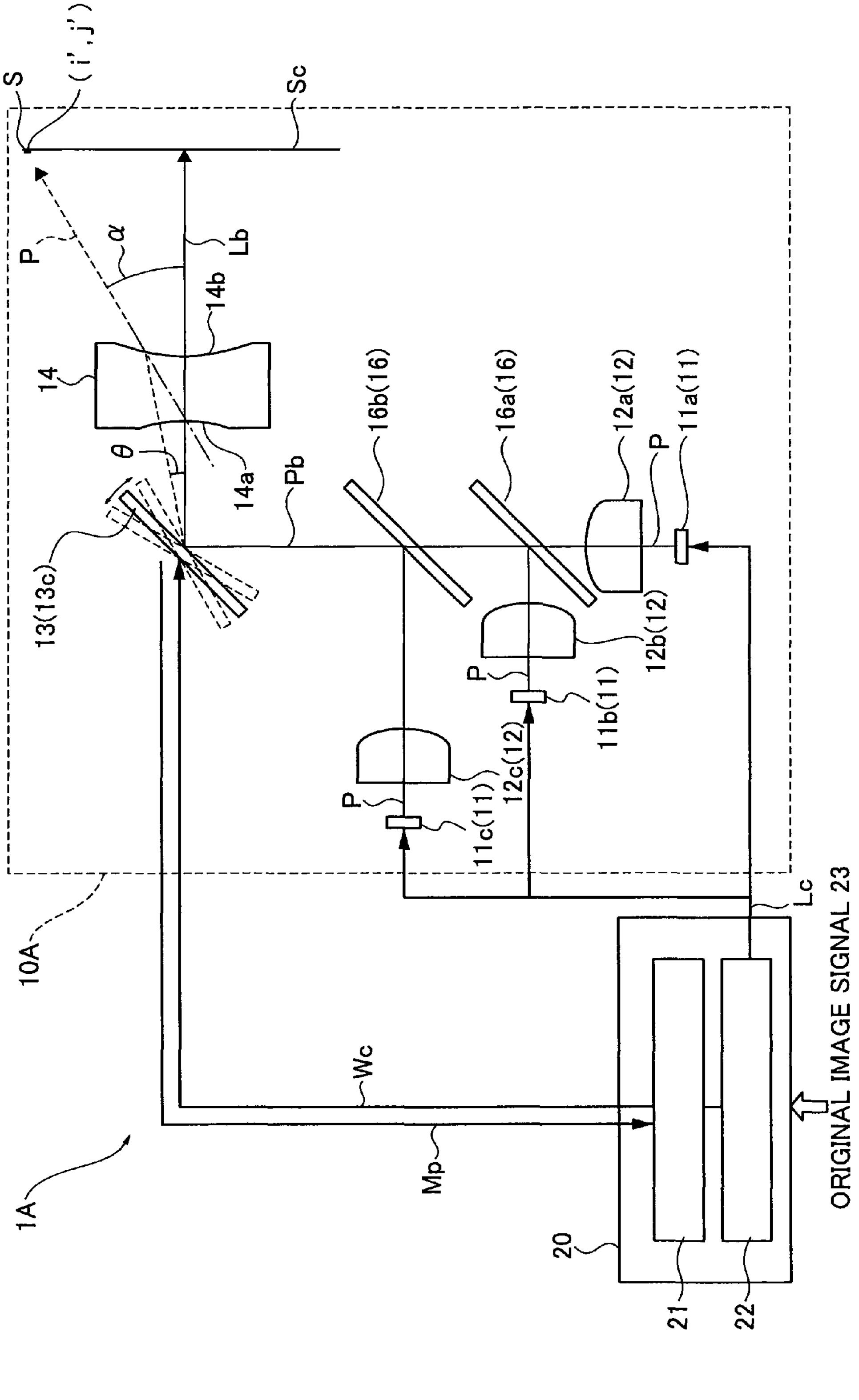
FIG. 8 schematically shows an image projector according to a second embodiment.

The focus lens 70 converges parallel light beams with the three wavelengths so as to form a predetermined size of spots S on the screen Sc (in FIG. 8 and else). It is made of a glass material with refractive indexes $n_{640}$=1.514846, $n_{530}$=1.519584, $n_{445}$=1.525786. The focus lens 70 includes a first face 70*a* facing the aperture element 72 and a second face 70*b* facing the optical deflector 13 which are both aspheric with the center of curvature on an axis 70*c*. The curvature radius of the first face 70*a* is 6.65277 mm while that of the second face 70*b* is 3.3 mm. The thickness of the focus lens 70 in the optical axis direction (between Q10 and Q11*on* the axis 70*c* of the first and second faces 70*a*, 70*b* respectively) is 2.0 mm. The focus lens 70 is disposed so that the axis 70*c* coincides with the optical axis of the single optical path (center of the opening of the aperture element 72). The combined light beam is directed to the optical deflector 13 through the focus lens 70.

The optical deflector 13 is configured the same as those of the optical scan units 10 (FIG. 2), 10A according to the first and second embodiments. In the optical scan unit 10At, the optical deflector 13 is placed so that the center 13*f* of the mirror portion 13*c* is on the optical axis of the single optical path, the normal line of the mirror portion 13*c* in the stationary state makes a 30 degree angle with the optical axis of the optical path (incidence angle=30 degrees), and the y' axis (the arrow y' in FIG. 17) is in the plane including the optical axes 12*tc*, 12*tg* of the first and second divergent light conversion elements 12At1, 12At2 (and the optical axis of the optical path). The x' axis (the arrow x' in FIG. 17) of the optical deflector 13 is a direction perpendicular to the drawing. The optical deflector 13 is configured to rotate slowly around the x' axis (sub scan direction) and to rotate fast around the y' axis (main scan direction). The light beam is deflected by the optical deflector 13 to the deflection angle conversion element 14At.

The deflection angle conversion element 14At is made of a glass material with refractive indexes $n_{640}$=1.506643, $n_{530}$=1.51199, $n_{445}$=1.519219. The deflection angle conversion element 14At is a lens having negative power and includes a first face 14*ta* facing the optical deflector 13 and a second face 14*tb* facing the screen Sc (FIG. 8 and else) as shown in FIG. 22. The first face 14*ta* is spherical with the center of curvature on the axis 14*tc* while the second face 14*tb* is aspheric and rotationally symmetric around the axis 14*tc*. The deflection angle conversion element 14 is disposed so that the axis 14*tc* coincides with a principal ray of the light beam deflected by the mirror portion 13*c* in the stationary state. The thickness thereof (from Q12 to Q13) on the axis 14*tc* is 1.3 mm. The first face 14*ta* is expressed by the above formula (1) in the orthogonal coordinate system (arrows x, y, z in FIG. 22) where a point Q12 on the axis 14*tc* is an origin point, a direction from the optical deflector 13 to the screen Sc is +z axis, an upper side of a direction orthogonal to the +z axis is +y axis, and a direction from the front to the back of the drawing and orthogonal to z and y axes is +x axis. The second face 14*tb* is expressed in the above formula (1) in the orthogonal coordinate system where a point Q13 on the axis 14*tc* is an origin point, and a direction from the optical deflector 13 to the screen Sc is +z axis. The data on the first and second faces are shown in the following table 10.

TABLE 10

| | FIRST FACE 14ta | SECOND FACE 14tb |
|---|---|---|
| r | −3.06894 | −0.00822 |
| k | 0 | −1553036.915 |
| A | 0 | −7.15587E−04 |
| B | 0 | 2.14538E−04 |
| C | 0 | −2.92748E−05 |
| D | 0 | 1.47948E−06 |

An incident light beam is converted (enlarged) by the deflection angle conversion element 14 into a light beam with a larger scan angle and projected to the screen Sc.

In the optical scan unit 10At, the optical axis 12*tg* of the second divergent light conversion element 12At2 is positioned 0.37 mm away from the point Q8 as a center of the first face 16*ta* of the optical path combiner unit 16At in the −Z-axis direction (global axis, from the first light source 11At1 to the optical path combiner unit 16At on the exit optical axis of the blue LD chip 11*tb*). The exit point (virtual emission point 11*te* of the SHG light with center wavelength 530 nm) of the second light source 11At2 is positioned 0.33 mm away from the point Q8 in the −Z axis direction.

The distance between the point Q11 of the first face 70*b* of the focus lens 70 and the center position 13*f* of the mirror portion 13*c* is set to 2.5 mm. The distance between the center position 13*f* of the mirror portion 13*c* and the point Q12 of the first face 14*ta* of the deflection angle conversion element 14 is set to 3.0 mm.

As shown in FIG. 17, the optical scan unit 10At comprises a light receiving element 71 which outputs a reception signal to the control unit 20 (FIG. 8) in a level in accordance with an amount of a received light beam. The optical path combiner unit 16At has about 5% of the amount of light beams with the three wavelengths transmitted therethrough. The light receiving element 71 is disposed so that its light receiving face receives the light beam reflected by or transmitted through the first and second faces 16*ta*, 16*tb* of the optical path combiner unit 16At.

In the optical scan unit 10At, the control unit 20 (FIG. 8) controls (feedback control) the drive current for the first and second light sources 11At1, 11At2 to adjust the amount of light emitted therefrom to a predetermined amount using the reception signal from the light receiving element 71. Accordingly, the optical scan unit 10At can form good color images without a change in brightness or color balance due to a change in ambient temperature or the like. Also, the other embodiments can adopt the feedback control using the light receiving element 71 and attain the same effects as those of the present embodiment.

The optical scan unit 10At can attain the same effects as those of the optical scan unit 10A in the second embodiment. Additionally, it uses a hybrid laser (HBLD) for the first light source 11At1 which incorporates the red and blue LD chips 11*ta*, 11*tb* in a single package, thereby downsizing an optical module for the color image projector.

Third Embodiment

An image projector 1B according to the third embodiment is described with reference to FIG. 9. The image projector 1B comprises an additional function to form better color images than the image projector 1A according to the second embodiment. The structure of the image projector 1B is the same as that of the image projector 1A; therefore, the same functions and components thereof are given the same numeric codes and a detailed description thereon is omitted.

The image projector 1B includes a control unit 203 which includes an image processing unit 26 (image processing circuit) in addition to the optical deflector control unit 21 and the light emission amount control unit 22. In order to project a good image on the screen Sc, the image processing unit 26 corrects image data G (i, j) based on an original image signal 23 received by the control unit 203 and outputs the corrected image data G' (i, j) to the optical deflector control unit 21 and the light emission amount control unit 22. By the image data correction, it is able to correct degradation of a color image on the screen Sc due to optical characteristics of the optical projection system (those of the divergent light conversion element 12*a*, 12*b*, 12*c* and deflection angle conversion element 14, and scan speed characteristic of the optical deflector 13, for example).

Types of image correction are described in the following.

(Deformation Correction)

Figure 9:
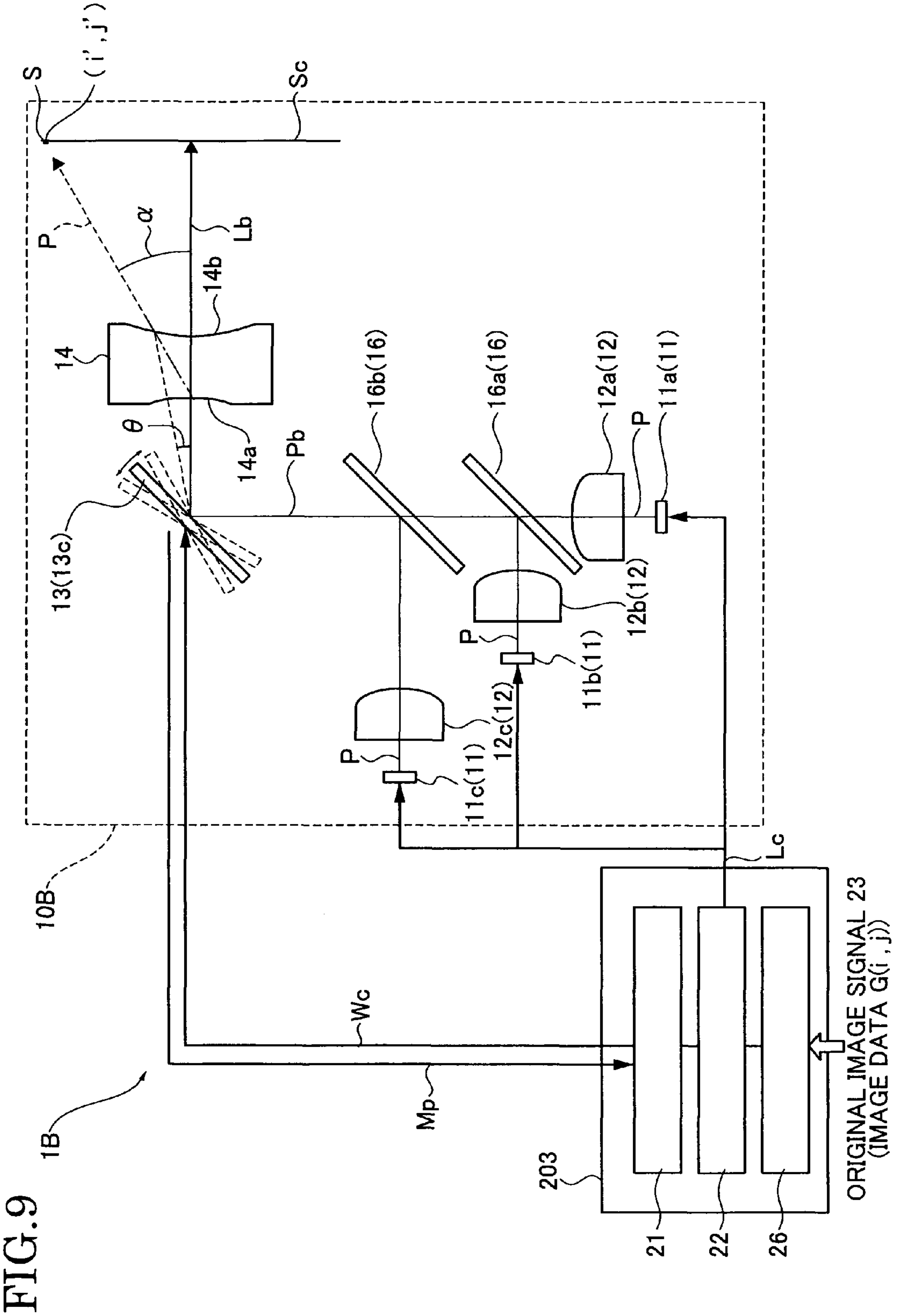
FIG. 9 schematically shows an image projector according to a third embodiment.
Figure 10:
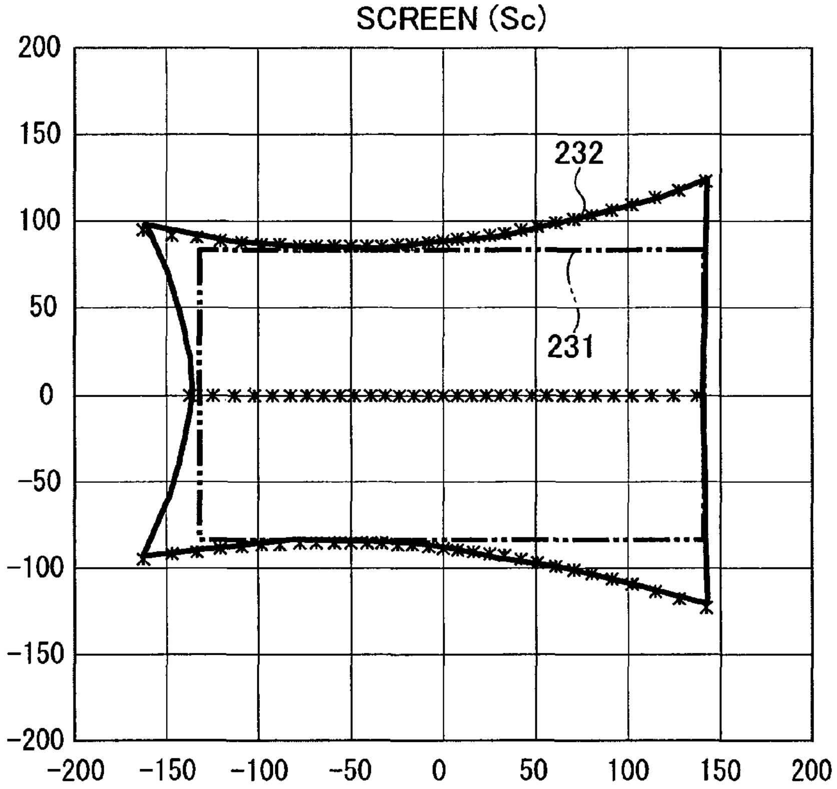
FIG. 10 shows degradation in a color image on a projection plane and a correction therefor.

FIG. 10 shows a deformed image and a corrected image on the screen Sc. In FIG. 10 a rectangle 231 is properly formed based on the original image signal 23 (FIG. 9) on the screen Sc while a rectangle 232 is deformed due to the optical system.

The deformed rectangular 232 is corrected to the rectangular 231 on the screen Sc. Specifically, each point on the deformed rectangle 232 is transformed to an appropriate point on the rectangle 231 to correctly project a color image on the screen in accordance with original image signals 23. Here, the positions of the spots S are determined by the amplitude of the optical deflector 13 under control of the optical deflector control unit 21. Therefore, the light emission amount control unit 22 is configured to control the emission timing and amount of the light sources 11*a*, 11, 11*c* in accordance with the amplitude of the optical deflector 13. The light sources are controlled to emit light at an intensity based on the angle of the optical deflector 13 and image data G (i, j) at a pixel (i, j), referring to a look-up table stored in a not-shown memory which shows a relation between the angle of the optical deflector 13 and the spot position (i, j). Further, a transformation function which transforms the deformed rectangle 232 into a proper rectangle 231 is acquired in advance to transform image data G (i, j) into image data G' (i, j). The light emission control over the light sources are performed in accordance with the operation of the optical deflector 13 to form the transformed image data G' (i, j) on the screen Sc. When the deformed rectangle 232 is corrected by changing the emission timing of the light sources, a portion of the deformed rectangle 232 outside the rectangle 231 is not illuminated. Because of this, integrated amount of light on the rectangle 231 is smaller than the deformed rectangle 232. Accordingly, the light source is controlled to emit an increased amount of light to form the rectangle 231 compared with that of light to form the deformed rectangle 232, to maintain the amount of light.

In the image projector 1B, when the control unit 203 receives an original image signal 23, the image processing unit 26 corrects the original image signal 23 properly, and the optical deflector control unit 21 and the light emission amount control unit 22 control the light sources 11*a*, 11*b*, 11*c*, and the optical deflector 13 based on the corrected original image signal 23. This enables generation of good images with very little deformation on the screen Sc.

(Trapezoidal Deformation Correction)

The image deformation may occur due to other factors. For example, when the image projector 1B and the screen Sc are relatively inclined to each other, a projected color image may include a trapezoidal deformation on the screen Sc. The image processing unit 26 or a not-shown equivalent processing unit can correct the trapezoidal deformation in the same manner as the above-described deformation.

Japanese Unexamined Patent Application Publication No. 2006-178346 and No. 2006-234157 disclose a technique to correct trapezoidal deformation by setting an optical system to realize a predetermined correction amount therefor. However, since the trapezoidal deformation is caused by the positional relation between the image projector 1B and the screen Sc, the amount and direction (relation between top side and bottom side) of the deformation will be changed according to the positional relation of the two. In particular, a change in the amount and direction of the deformation is conspicuous in projection with a mobile device incorporating the image projector 1B. With the above taken into consideration, the image projector 1B according to the third embodiment is configured to be able to adjust the amount of trapezoidal deformation correction with the image processing unit 26 or an equivalent processing unit. For example, it can be configured to allow a user to adjust the correction amount through a manipulation to a jog dial or buttons while viewing a projected image. In this case, it is possible for the image projector 1B to project a corrected image in accordance with the adjusted correction amount by storing a transformation function for trapezoidal deformation and changing the transformation function or coefficients thereof according to the correction amount. Thus, the image projector 1B can form color images with very little deformation.

(Correction of Unevenness in Brightness)

In the image projector 1B, the mirror portion 13*c* of the optical deflector 13 is vibrated sinusoidally for forming spots S, so that the scan angle α (deflection angle θ) of a light beam varies sinusoidally relative to time. For this reason, the scan speed is fastest at zero in the time axis or the scan angle α (deflection angle θ) being zero, and the larger the scan angle α (deflection angle θ), the slower the scan speed as shown in FIG. 4B 4C. That is, an integrated amount of light per pixel differs depending on the scan angle α. In scanning a projection plane with a light beam having a certain level of luminance, an area of the projection plane which is scanned at a small scan angle α will be dark due to a small integrated amount of light per pixel since the light beam passes therethrough at a high scan speed. In contrast, an area of the projection plane which is scanned at a large scan angle α will be bright due to a relatively large integrated amount of light per pixel since the light beam passes therethrough at a low scan speed.

Similarly to the image projector 1A according to the modification of the first embodiment, the image projector 1B shows the constant scan speed in a certain range and an improved evenness in intensity of the light beam. However, further correcting the improved evenness leads to improving quality of a projected color image. The unevenness in brightness distribution is correctable by the image processing unit 26 or a not-shown equivalent processing unit which adjusts emission amounts of the light sources 11*a*, 11*b*, 11*c*. For this purpose, the image processing unit determines a pixel position (i, j) of a spot from the mirror position signal Mp (the angle of the mirror portion 13*c*) and controls the light sources to emit light beams with intensity corrected in accordance with the pixel position (i, j). The correction of unevenness in brightness is done so that the light sources are controlled to emit light to the periphery of an image with a relatively low intensity or in a relatively short emission time while they are controlled to emit light to the center of an image with a relatively high intensity or in a relatively long emission time. The light intensity at the pixel (i, j) is correctable by referring to a lookup table stored in a not-shown memory and showing a relation between the pixel position (i, j) and correction amounts (corrected light intensity). Also, the light intensity can be corrected by a function for the pixel (i, j) and the correction amounts. Accordingly, the image projector 1B can form images with very little unevenness in the brightness.

(Deformation Correction 2)

As described above, a deformation occurs in a color image due to a decrease in the scan speed along with an increase in the scan angle α (deflection angle θ). Such an image deformation is correctable in the same manner as the above-mentioned deformation by the image processing unit 26 or a not-shown equivalent processing unit. Accordingly, the image projector 1B can form images with very little distortion.

(Color Correction)

The image projector 1B FIG. 9 is configured to combine three light beams (red, green, blue) with different wavelengths from the light sources 11*a*, 11*b*, 11*c* into one, and deflect the light by the optical deflector 13 and convert the deflection angle θ of the light into the scan angle α by the single deflection angle conversion element 14. Due to the different wavelengths of the combined light, color aberration occurs and the converted scan angle α of the light differs depending on the wavelength, which may cause color shifts in the spots S formed based on the same image data G (i, j) on the screen Sc.

Amount of such color shifts can be obtained by measuring or designing for each of the wavelengths (red, green, blue), so that the color shifts can be corrected by correcting the spot positions S of the light beams from the light sources 11*a*, 11*b*, 11*c*. Thus, the image processing unit 26 or an equivalent processing unit controls the light sources 11*a*, 11*b*, 11*c* to emit light beams at timing in accordance with the moving of the mirror portion 13*c* of the optical deflector 13. For example, the image processing unit 26 can adjust emission timing of the light sources 11*a*, 11*b*, 11*c* independently according to shift amounts of the spot positions for the three colors. Thereby, images without color shifts can be formed on the screen Sc.

Further, such color shifts may occur due to various factors of the light sources 11*a*, 11*b*, 11*c* and the optical path combiner unit 16 such as assembling error and conditioning error, differences in parts and components thereof, and a change due to temperature or a temporal change. Therefore, it is preferable that the correction amount for the color shifts is changeable when appropriate in the image processing unit 26 or an equivalent processing unit. For example, with provision of a correction operation unit (not shown), the correction amount can be adjusted in accordance with an input from the correction operation unit. Accordingly, the image projector 1B can form color images with very little color shift.

Fourth Embodiment

Figure 11:
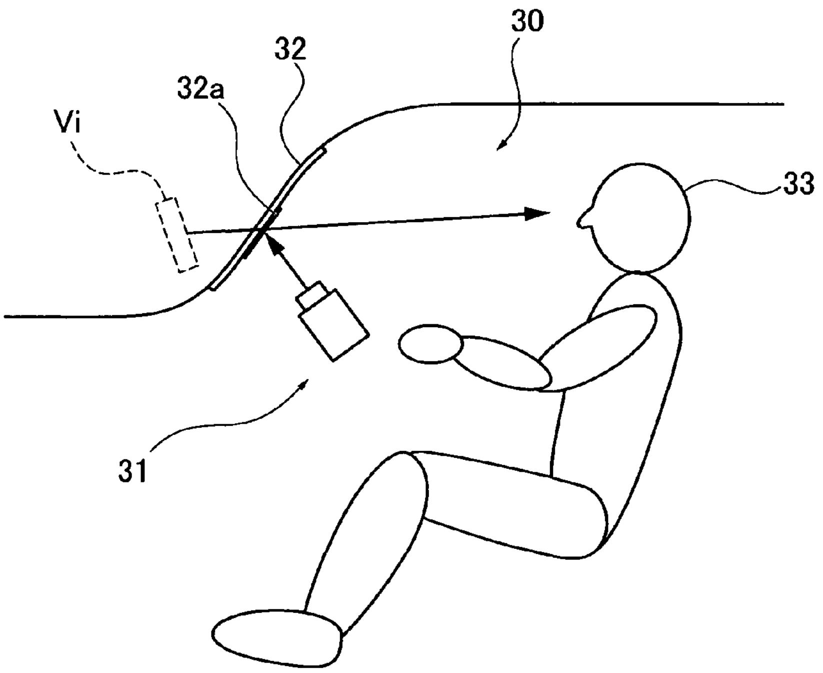
FIG. 11 schematically shows a vehicle head-up display device according to a fourth embodiment.

Next, a head-up display device for a vehicle 30 incorporating the image projector according to any one of the first to third embodiments with reference to FIG. 11.

The head-up display device 30 is provided inside a vehicle, and mainly comprises a projector 31 and a wind shield 32 which reflects light from the projector 31.

The projector 31 is any one of the image projectors according to the first and third embodiments, and projects an image onto a predetermine position in the optical axis direction. The projector 31 is disposed so that its optical axis (emission direction of the light source 11 or the light sources 11*a* to 11*c*) is directed to the wind shield 32 and the wind shield 32 reflects light in a direction to the head of a driver 33.

The wind shield 32 without coating has reflectance of about a few % as a glass surface reflectance to be able to reflect light enough to project an image. Since it includes a partial reflective face 32*a* to reflect a light beam from the light source 11 (11*a* to 11*c*) and shows an improved reflectance, the projector 31 can form images with lower illuminance of the light source. For improving the reflectance, the partial reflective face 32*a* can include a thin metal film, a dielectric multi layer or the like by coating or vapor deposition. Alternatively, the partial reflective face 32*a* can include a microstructure which can be formed by coating a resin on a target area and imprinting the area by a known technique. In addition, the microstructure can be directly formed in a mold of the wind shield. It is preferable to configure the partial reflective face 32*a* to efficiently reflect only a light beam with a specific wavelength, especially when the light source is a laser or an LED emitting a monochrome light beam in a relatively small bandwidth as in the above-embodiments. This can enhance contrast and visibility of projected images. Further, by use of a laser for the light source, it is able to increase the freedom of designing the layers and microstructure with the polarization selective characteristic. The partial reflective face 32*a* can have ambient light transmit therethrough and reflect a light beam from the light source 11 to the eyes of the driver 33 in a driver seat.

The partial reflective face 32*a* is provided inside a vehicle so that the above layers or the microstructure can be protected from wind or friction with windshield wipers. Further, providing a reflection preventive layer on the outer face of the windshield in a corresponding position to the partial reflective face 32*a* makes it possible to suppress reflection from the outer face, prevent formation of overlapping images and improve quality of projected images.

By driving the projector 31, a light beam is emitted to the partial reflective face 32*a* and reflected thereby to the direction of the eyes of the driver 33. At this time, a virtual image Vi is formed at the front of the wind shield 32. The driver 33 sees a projected image by the partial reflective face 32*a* as the virtual image Vi.

The fourth embodiment describes as an example the head-up display device 30 (FIG. 11) which reflects a light beam from the projector 31 by the partial reflective face 32*a* to project an image on the front of the windshield as a virtual projection plane. However, the present invention is not limited to such a configuration. The head-up display device can be configured in any manner as long as it incorporates the image projector according to any one of the first to third embodiments. For example, it can be configured that the projector 31 projects an image on a screen (screen Sc) provided above an instrument panel (dashboard), and the driver 33 sees the projected image via the partial reflective face 32*a*. In this case, a virtual image of the image projected on the screen is seen at the front of the wind shield 32. Another example is that an image is directly projected on the partial reflective face 32*a* of the wind shield 32.

Furthermore, according to the vehicle head-up display device 30, the projector 31 can be an image projector 1C according to the following fifth embodiment in addition to the image projector according to any one of the first to third embodiments.

Fifth Embodiment

Next, an image projector 1C according to the fifth embodiment is described with reference to FIG. 23. The image projector 1C includes a beam splitter to allow the incidence angle φ (see modification of the first embodiment) of light on the mirror portion to be almost zero. The structure of the image projector 1C is basically the same as that of the image projector 1A in the second embodiment, so that the same components and functions are given the same numeric codes and a detailed description thereon is omitted. Note that FIG. 23 omits showing the control unit 20 (control unit 203) for the sake of simplicity.

The image projector 1C includes an optical scan unit 10C which comprises a beam splitter 50 and a focus lens 51 between the optical deflector 13 and the deflection angle conversion element 14. In the optical scan unit 10C, the light source 11*a* emits linearly polarized divergent light with a center wavelength of 640 nm, the light source 11*b* emits that with a center wavelength of 530 nm, and the light source 11*c* emits that with a center wavelength of 450 nm. The divergent lights are converted into substantially parallel lights by the divergent light conversion elements 12*a*, 12*b*, 12*c*, respectively, and they transmit through the optical path combiner units 16*a*, 16*b* and are directed to the beam splitter 50.

The beam splitter 50 is comprised of a prism including a polarization separation film 50*a* and a phase plate 52. The polarization separation film 50*a* works for polarization separation and is set to reflect the linearly polarized parallel lights with the center wavelengths of 640, 530, 450 nm from the optical path combiner units 16*a*, 16*b*. The phase plate is made of a plane λ/4 plate to help the polarization separation of the polarization separation film 50*a*. The prism of the beam splitter 50 is made of a glass material with a high refractive index; therefore, it allows a light beam deflected by the optical deflector 13 to be incident at a constant angle onto the polarization separation film 50*a*.

In the fifth embodiment, a glass material SF11 manufactured by SCHOTT AG (refractive indexes $n_{640}$=1.777781, $n_{530}$=1.795226, $n_{450}$=1.819054) is used for the prism of the beam splitter 50. The beam splitter 50 including the phase plate 52 is formed in a cube with sides of 4 mm. The polarization separation film 50*a* is inclined at 45 degrees relative to the phase plate 52 and it has the same refractive index as that of the beam splitter 50. The beam splitter 50 is disposed so that the polarization separation film 50*a* reflects linearly polarized parallel light from the optical path combiner units 16*a*, 16*b* in a direction coincident with a perpendicular line of the phase plate 52. The parallel light reflected by the polarization separation film 50*a* are converted into circular polarized light by the phase plate 52. In the traveling direction of the converted parallel light the focus lens 51 is provided.

The lens face of the focus lens 51 has an aspheric shape expressed by the formula (1) in the first embodiment and center thickness thereof is 1.8 mm. The focus lens 51 makes the circular polarized parallel light into the circular polarized convergent light. The optical deflector 13 is provided in the traveling direction of the circular polarized convergent light to face the focus lens 51. The circular polarized convergent light is deflected by the mirror portion 13*c* rotating in a predetermined angle range to be incident on the focus lens 51 again, and incident on the phase plate 52 and the beam splitter 50. Through the phase plate 12, the circular polarized convergent light is converted into linearly polarized light with a phase 90 degrees rotated relative to that of the linearly polarized parallel light reflected by the polarization separation film 50*a*. Thereby, the incident convergent light transmits through the polarization separation film 50*a* again. The deflection angle conversion element 14 is provided in the traveling direction of the convergent light and has an xy polynomial aspheric shape which is a free-form, rotationally asymmetric face expressed by the following formula (3) in the orthogonal coordinate system in which the optical axis direction from the optical deflector 13 to the deflection angle conversion element 14 is +Z-axis direction. The center thickness thereof is 2 mm.

$$z = \frac{ch^2}{1 + SQRT[1 - (1+k)c^2h^2]} + \sum_{j=2}^{p} C_j x^m y^n, \tag{3}$$

$$j = [(m+n)^2 + m + 3n]/2 + 1$$

$$h^2 = x^2 + y^2$$

where SQRT(Q) represents square root of Q, z represents a sag of a plane parallel to the Z axis, c represents paraxial curvature (c=1/r where r is curvature radius), k is a conic constant, and Cj is a coefficient of $x^m y^n$ (C1=k).

The focus lens 51 includes a first face 51*a* facing the optical deflector 13 and a second face 51*b* facing the beam splitter 50 (phase plate 52). Data on the first and second faces 51*a*, 51*b* is shown in the following table 11. Also, the deflection angle conversion element 14 includes a first face 14*a* facing the beam splitter 50 and a second face 14*b* on the opposite side. Data on the first and second faces 14*a*, 14*b* is shown in the following table 12. In the tables 11, 12 "E-0*n*" signifies $10^{-n}$.

TABLE 11

| | FIRST FACE 51a | SECOND FACE 51b |
|---|---|---|
| Y CURVATURE RADIUS | −19.27821 | −7.81898 |
| CONIC CONSTANT (K) | 0 | 0 |
| 4th ORDER COEFFICIENT (A) | −1.03837E−02 | −7.72978E−03 |
| 6th ORDER COEFFICIENT (B) | 2.60615E−02 | 1.99134E−03 |
| 8th ORDER COEFFICIENT (C) | −1.15980E−01 | −2.83959E−03 |
| 10th ORDER COEFFICIENT (D) | 1.78671E−01 | 1.06423E−03 |

TABLE 12

| | FIRST FACE 14a | SECOND FACE 14b |
|---|---|---|
| Y CURVATURE RADIUS | −2.61282 | −21.37601 |
| C1 | −6.37139E−02 | −6.32679E+01 |
| C2 | 1.36565E−02 | 1.58637E−02 |
| C3 | −1.92926E−02 | −3.26041E−02 |
| C4 | −9.95952E−03 | −4.88315E−02 |
| C5 | −8.77081E−04 | −6.86162E−04 |
| C6 | −5.71051E−03 | −4.48665E−02 |
| C7 | 3.83616E−03 | 3.07467E−03 |
| C8 | 1.96274E−03 | 2.32631E−03 |
| C9 | 9.95785E−05 | −1.75772E−04 |
| C10 | −8.56356E−04 | 1.95995E−04 |
| C11 | 5.61833E−03 | 2.15677E−03 |
| C12 | −2.51097E−06 | 5.05552E−04 |
| C13 | 8.70872E−06 | −1.18958E−03 |
| C14 | 1.23661E−04 | 7.97527E−05 |
| C15 | 6.18582E−04 | −5.65857E−04 |
| C16 | 1.11484E−03 | 3.92203E−04 |

In the fifth embodiment, the focus lens 51 and deflection angle conversion element 14 are made of a glass material BK7, by SCHOTT AG (refractive indexes $n_{640}$=1.514846, $n_{530}$=1.519584, $n_{450}$=1.525320). A distance between the beam splitter 50 and the focus lens 51 on the optical axis is 0.2 mm and that between the focus lens 51 and the optical deflector 13 (mirror portion 13*c*) is 0.5 mm and that between the beam splitter 50 and the deflection angle conversion element 14 is 1.5 mm. In view of downsizing the image projector, the divergent light conversion element 12 and beam splitter 50 should be preferably disposed close to each other.

Figure 24:
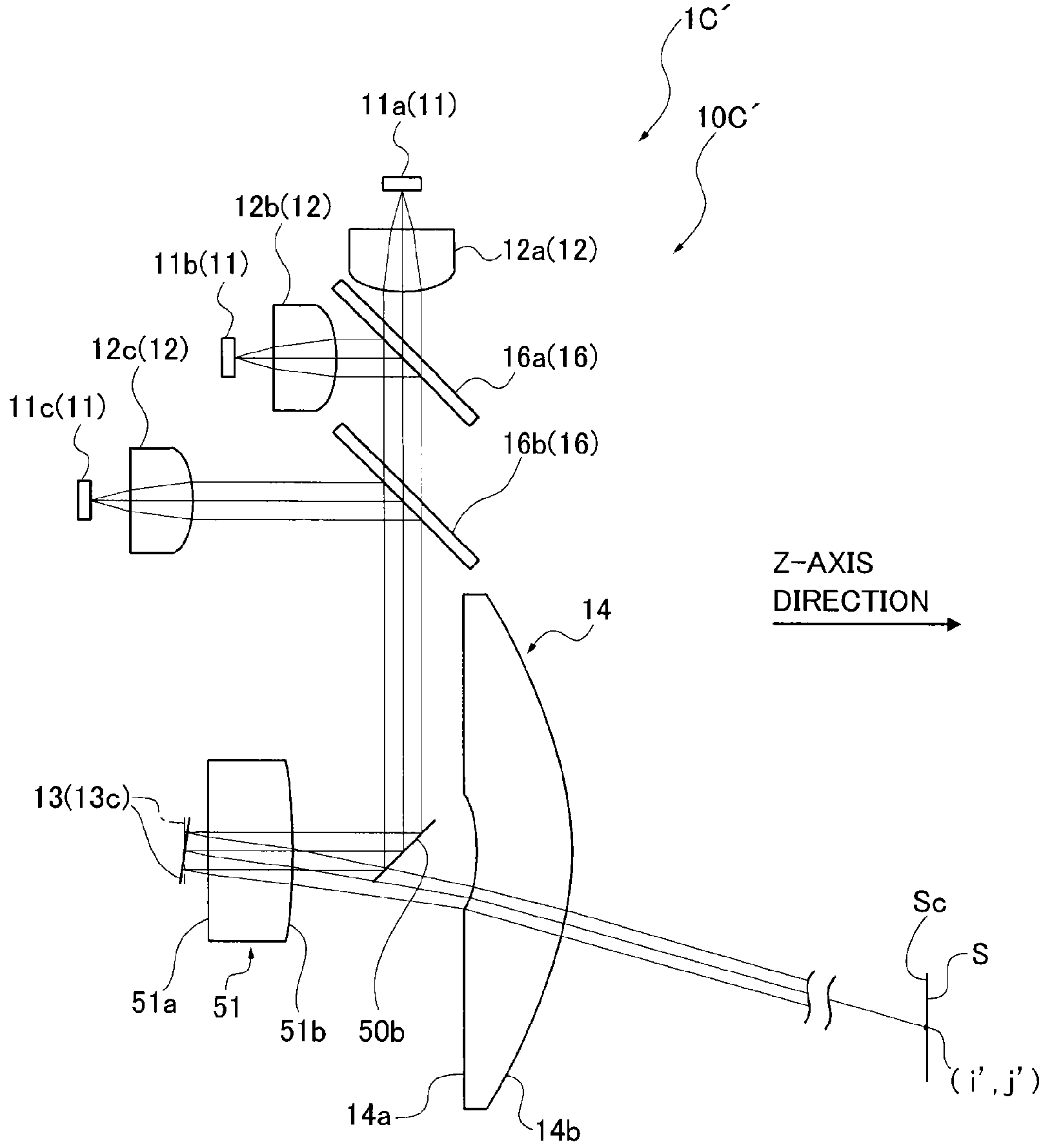
FIG. 24 schematically shows another optical scan unit for comparison with that of the image projector according to the fifth embodiment.

An optical scan unit 10C' is described for comparison with the optical scan unit 10C with reference to FIG. 24 which also omits showing the control unit 20 (control unit 203) for the sake of simplicity. The optical scan unit 10C is the same as the optical scan unit 10C' except that it does not include the beam splitter 50 and the distance between the focus lens 51 and the deflection angle conversion element 14 is 2.2 mm. This is to narrow the spot size appropriately without the beam splitter 50. Further, a reflective face 50*b* having an equivalent polarization separation to that of the polarization separation film 50*a* and the phase plate 52 of the optical scan unit 10C is provided.

Figure 23:
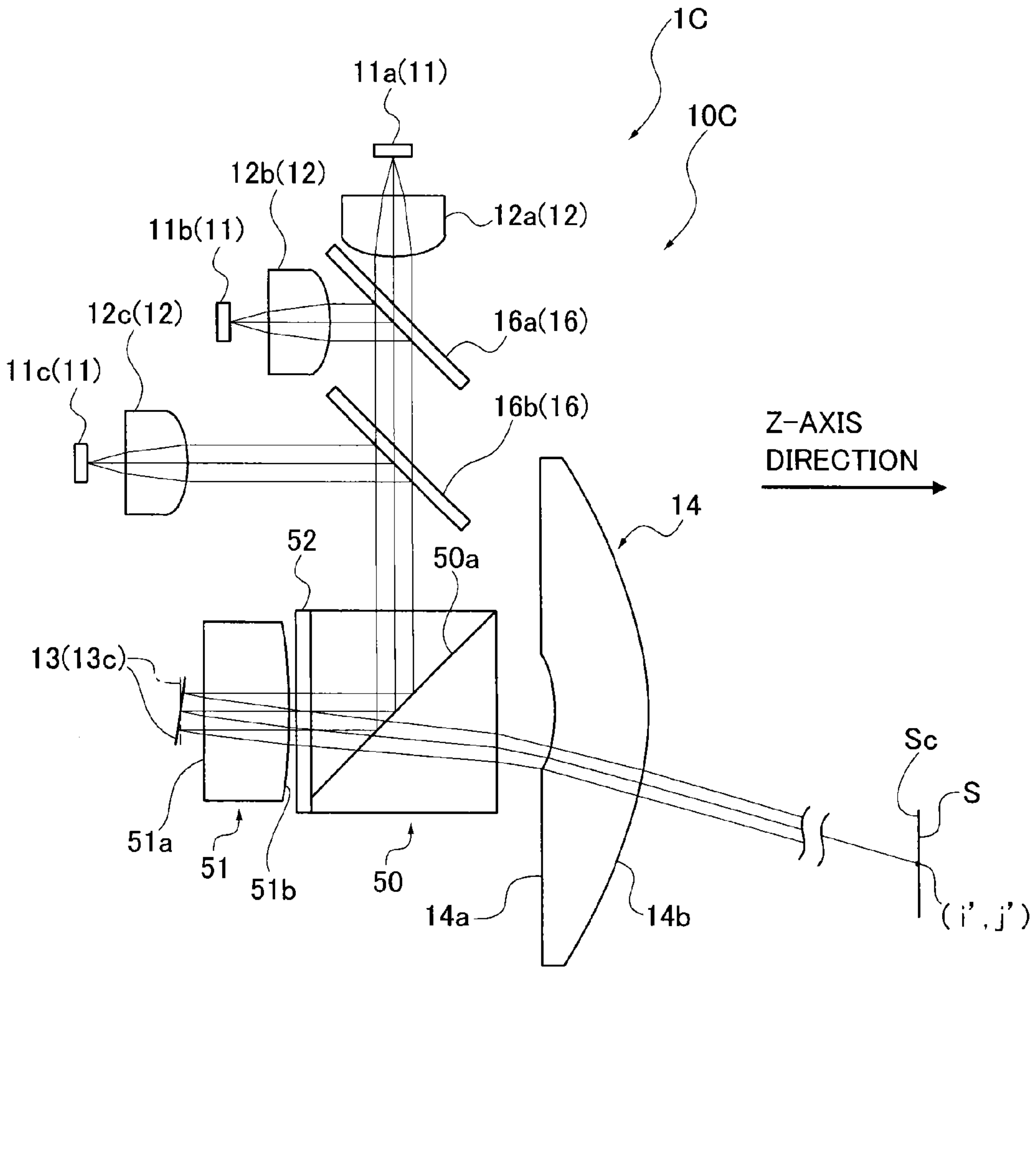
FIG. 23 schematically shows the structure of an image projector according to a fifth embodiment.
Figure 25A:
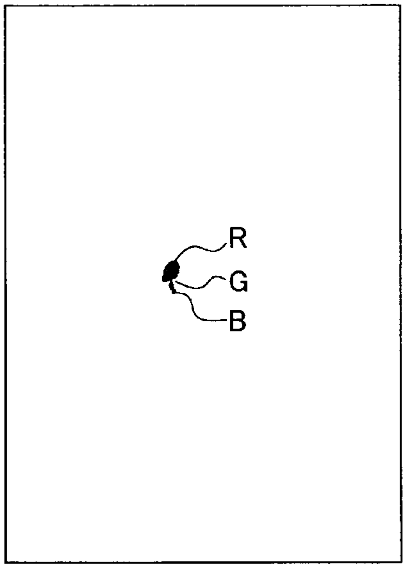
FIGS. 25A, 25B show spot diagrams on an image plane when the optical deflector is rotated by 5 degrees around an X-axis by the optical scan unit according to the fifth embodiment and by the one in FIG. 24, respectively.
Figure 25B:
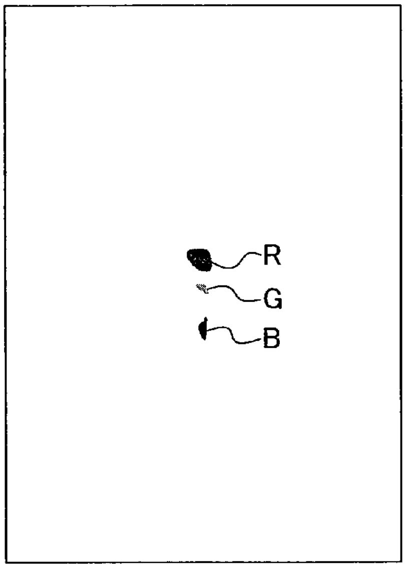

The optical scan units 10C, 10C' in FIG. 23, 24 are both designed to focus a light beam at a position 205 mm away from the second face 14 of the deflection angle conversion element 14. FIG. 25A, 25B show spot diagrams on an image plane when the optical deflectors 13 of the optical scan units 10C, 10C' are rotated around the x axis at 5 degrees, respectively.

In FIG. 25A, the optical scan unit 10C forms spots of the three colors (R, G, B) at almost the same position while the optical scan unit 10C' forms the same at different positions. Accordingly, the optical scan unit 10C including the beam splitter 50 can correct color aberration.

The deflection angle conversion element 14 is a lens having negative power and refracts a light beam from the inclined optical deflector 13 to be divergent (emitted in a direction away from the optical axis). It refracts incident light with a shorter wavelength more greatly. This is conspicuous in the optical scan unit 10C'. In contrast, in the optical scan unit 10C including the beam splitter 50, the beam splitter 50 splits an incident light beam in accordance with the wavelength, and emits a light beam with a shorter wavelength in a direction to approach the optical axis.

As described above, the optical scan unit 10C can reduce color aberration since the characteristics of the beam splitter 50 and the deflection angle conversion element 14 are set with a difference in the refractive index of light beams with different wavelengths taken into account.

With use of the beam splitter 50, it is possible to set the incidence angle $\phi$ of light on the mirror portion 13*c* to zero in the optical scan unit 10C so that it can be free from image deformation due to the incidence angle.

Figure 26:
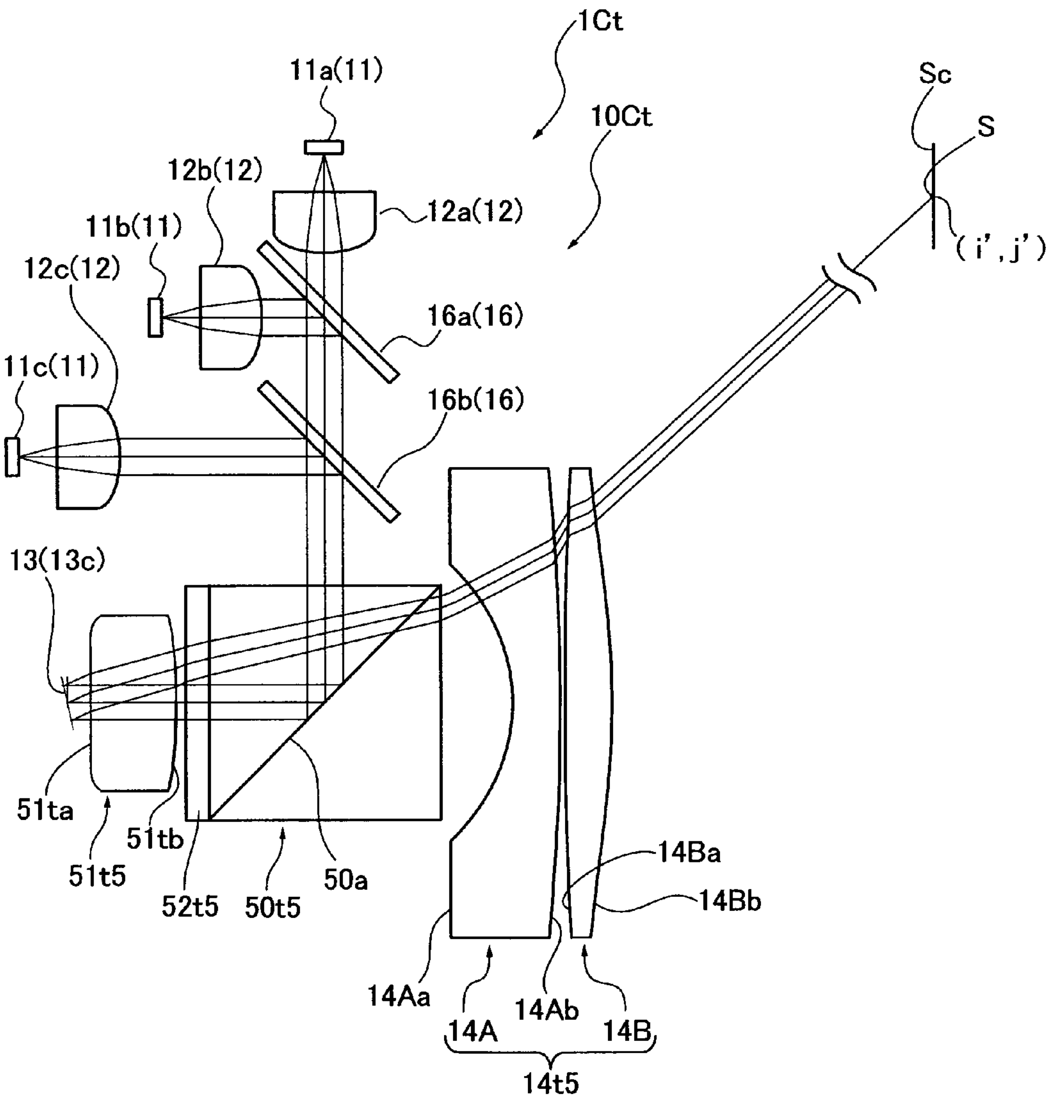
FIG. 26 schematically shows the structure of an optical scan unit of a modification of the image projector according to the fifth embodiment.

Next, an image projector 1Ct as a modification of the image projector in the fifth embodiment is described with reference to FIG. 26. In the image projector 1Ct a deflection angle conversion element 14*t*5 is comprised of plural lenses (two in the present embodiment) made of different glass materials from each other. The structure of the image projector 1Ct is basically the same as that of the image projector 1C in the fifth embodiment, so that the same components and functions are given the same numeric codes and a detailed description thereon is omitted. Note that FIG. 26 omits showing the control unit 20 (control unit 203) for the sake of simplicity.

The deflection angle conversion element 14*t*5 includes a first lens 14A and a second lens 14B. The first lens 14A is made of a glass material LaF2 by HOYA Co. Ltd. (refractive indexes $n_{640}$=1.740080, $n_{530}$=1.749756, $n_{450}$=1.762083). The first lens 14A includes an aspheric first face 14Aa facing a beam splitter 50*t*5 and a spherical second face 14Ab. Data on the first and second faces are shown in the following table 13.

TABLE 13

| | FIRST FACE 14Aa | SECOND FACE 14Ab |
|---|---|---|
| r | −3.81443 | −57.69500 |
| k | 0 | 0 |
| A | 4.96976E−04 | 0 |
| B | 2.37495E−04 | 0 |
| C | −2.17429E−05 | 0 |
| D | 1.23840E−06 | 0 |

The second lens 14B is made of the above-mentioned glass material SF11 by SCHOTT AG. The second lens 14B includes a spherical first face 14Ba facing the first lens 14A and an aspheric second face 14Bb. Data on the first and second faces are shown in the following table 14.

TABLE 14

| | FIRST FACE 14Ba | SECOND FACE 14Bb |
|---|---|---|
| r | 55.69676 | −21.45130 |
| k | 0 | 0 |
| A | 0 | 5.65731E−04 |
| B | 0 | −1.38671E−06 |
| C | 0 | −1.68803E−07 |
| D | 0 | 2.42731E−09 |

In the image projector 1Ct, optical data and sizes of the beam splitter 50*t*5 and a focus lens 51*t*5 are different from those in the image projector 1C of the fifth embodiment.

The beam splitter 50*t*5 is comprised of a cubic prism with sides of 5 mm made of the glass material SF11 by SCHOTT AG and a phase plate 52*t*5 in thickness of 0.5 mm. The phase plate 52*t*5 has refractive indexes of $n_{640}=1.515$, $n_{530}=1.520$, $n_{450}=1.525$.

The focus lens 51*t*5 is made of the above-mentioned glass material BK7 by SCHOTT AG and has an aspheric shape expressed by the formula (1) in the first embodiment. The center thickness is 1.8 mm. The focus lens 51*t*5 includes a first face 51*ta* facing the optical deflector 13 and a second face 51*tb* facing the beam splitter 50*t*5. Data on the first and second faces are shown in the following table 15. In the table 15 "E-0*n*" signifies $10^{-n}$.

TABLE 15

| | FIRST FACE 51ta | SECOND FACE 51tb |
|---|---|---|
| r | 11.95774 | 93.94806 |
| k | 0 | 0 |
| A | 2.87818E−03 | 2.69767E−03 |
| B | 1.59861E−04 | 1.15924E−03 |
| C | 7.04233E−05 | 1.91127E−03 |
| D | 2.00773E−05 | −1.14693E−03 |

Figure 27A:
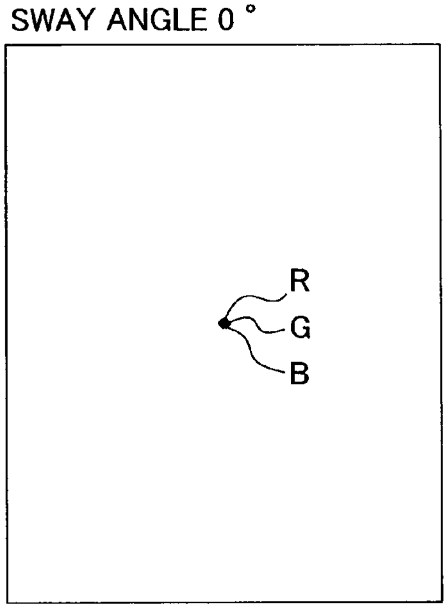
FIG. 27A is a spot diagram on an image plane when an optical deflector is in a reference position (stationary position) rotated by 0 degree (amplitude=0)
Figure 27B:
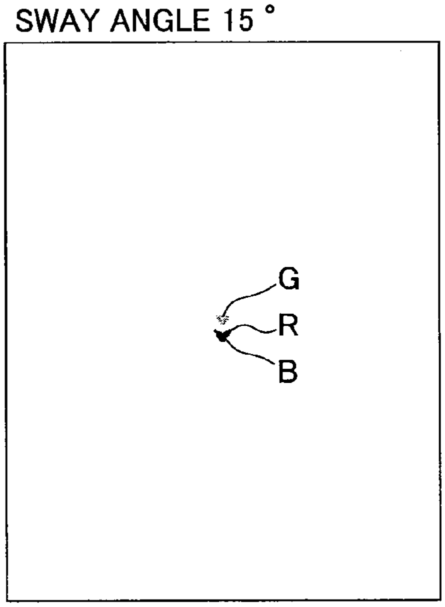
FIG. 27B is the same when the optical deflector is rotated by 15 degrees (amplitude=15 degrees) in the modification of the optical scan unit according to the fifth embodiment.

FIG. 27A shows a spot diagram on an image plane when the optical deflector 13 is in the reference position (stationary position, rotation angle=0, sway angle=0) in the optical scan unit 10Ct, while FIG. 27B shows the same when the optical deflector 13 is rotated at 15 degrees (sway angle=15 degrees) around one of the axes.

In FIG. 27A spot positions of the R, G, B colors are almost coincident with each other when the optical deflector 13 is not rotated, and in FIG. 27B they are in a very small area near the center of the image plane. As seen from FIG. 27A, 27B, by use of the deflection angle conversion element 14*t*5 comprised of the first and second lenses 14A, 14B made of different glass materials, the optical scan unit 10Ct can reduce color aberration. It is preferable that a glass material or optical data of the first and second lenses 14A, 14B are optimally selected or set with the beam splitter 50*t*5 or other optical elements taken into consideration. Further, although not shown in the drawing, when the optical deflector 13 is rotated at 15 degrees (deflection angle θ=30 degrees), the scan angle α of a light beam having passed through the deflection angle conversion element 14*t*5 is about 45 degrees. Accordingly, it is confirmed that the deflection angle conversion element 14*t*5 can have deflection angle converting (enlarging) function.

Sixth Embodiment

Figure 28A:
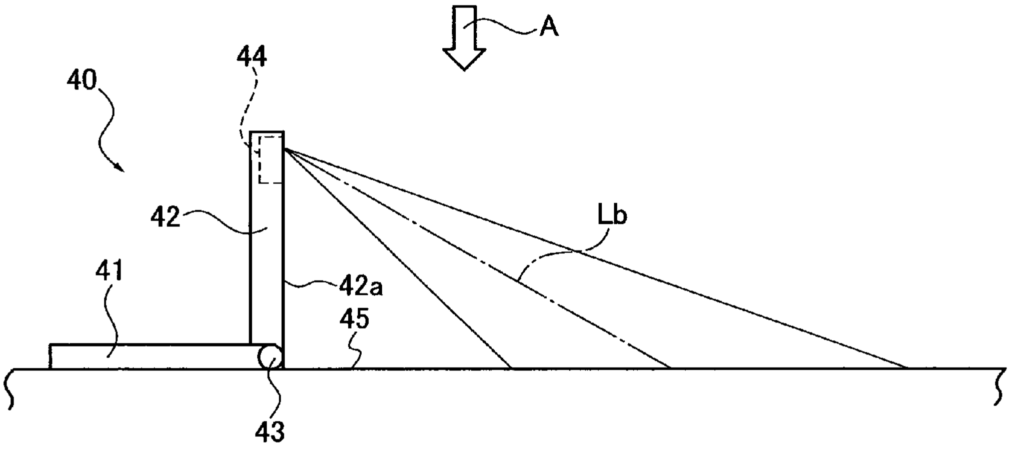
FIG. 28A is a side view of a mobile phone on a plane according to a sixth embodiment and FIG. 28B show the mobile phone in FIG. 28A seen from the arrow A.
Figure 28B:
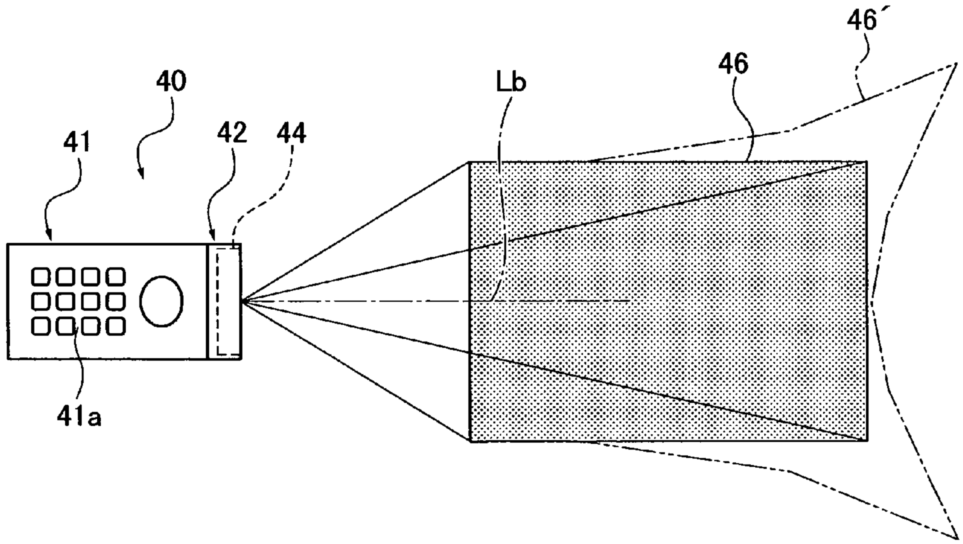
Figure 29:
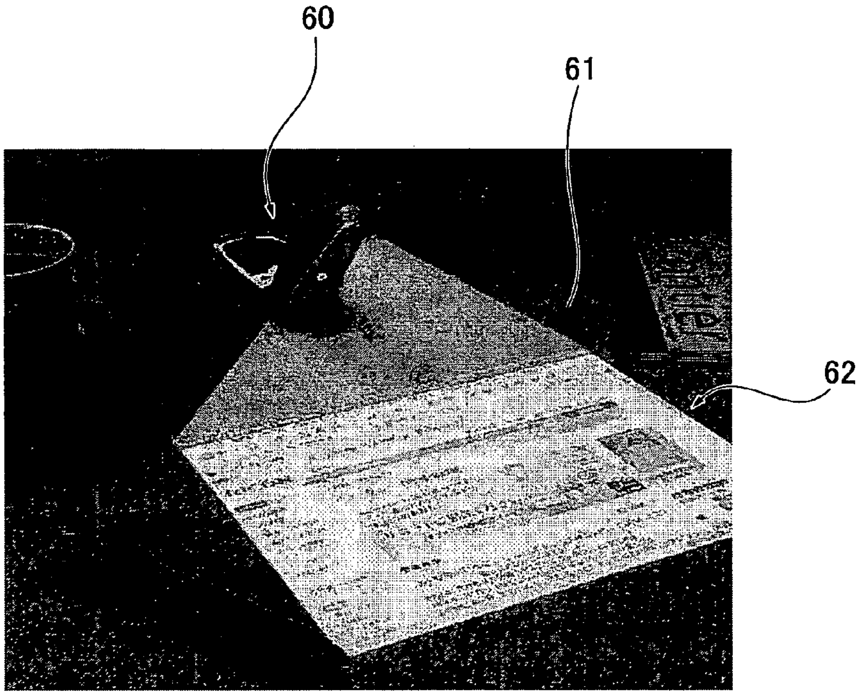
FIG. 29 shows an example of a mobile phone incorporating an image projector.

A mobile phone 40 incorporating the image projector according to one of the first to third and fifth embodiments is described with reference to FIG. 28A, 28B. FIG. 28 is a side view of the mobile phone 40 on a plane for example while FIG. 28B shows the mobile phone 40 of FIG. 28A seen from the arrow A.

The mobile phone 40 according to the sixth embodiment comprises a phone body 41 with a key manipulation part 41*a*, a cover portion 42 including a not-shown screen display, and a shaft 43 rotatably connecting the phone body 41 and the cover portion 42. Although not shown in the drawings, the mobile phone 40 has a folded (closed) state in which the phone body 41 and the cover portion 42 are in parallel to each other, and an open state in which the phone body 41 and the cover portion 42 are away from each other at a predetermined angle.

In the mobile phone 40, the cover portion 42 includes a projector 44 which is comprised of the image projector according to the present invention and projects images on a predetermined position in the optical axis direction. In the present embodiment, the projector 44 is configured to project an image 46 on a plane 45 on which the mobile phone 40 in the open state (the cover portion 42 is perpendicular to phone body 41) is placed.

The optical axis direction Lb (emission direction of light source 11 or light sources 11*a* to 11*c*) is inclined relative to the plane 45 so that light is directed from the top face 42*a* of the cover portion 42 standing on the plane 45 to the plane 45.

Images projected on the plane 45 by the projector 44 in the same manner as in the above embodiments may have trapezoidal deformation (46' indicated by chain double-dashed line in FIG. 28B) because the optical axis Lb is inclined to the plane 45. The trapezoidal deformation can be corrected as follows.

The size of the mobile phone 40 and the position of the projector 44 in the mobile phone 40 are predetermined. Therefore, a distance from a light emitting point of the projector 44 (deflection angle conversion element in the above embodiments) to the projection plane or their positions can be determined based on settings of a projector mode of the mobile phone 40 and a positional relation between the mobile phone 40 and the projection plane. In the present embodiment, the position of an image to be projected on the plane 45 is determined based on the distance from the light emitting point of the projector 44 to the plane 45, the incidence (projection) angle of the optical axis relative to the plane 45, and the position of the phone body 41 on the plane 45. Accordingly, it is able to know in advance how much an image is deformed trapezoidally on the plane 45 relative to a proper rectangular image 46. In the mobile phone 40 spot positions based on image data are corrected to form the proper rectangular image 46 based on the original image signal. The deformation correction in the mobile phone is performed in the same manner as in the third embodiment so that a detailed description thereon is omitted.

In the projector mode of the mobile phone 40, the phone body 41 is placed in a predetermined manner (in the open state in the present embodiment) to project an image onto a desirable place (plane 45). The mobile phone 40 projects the image 46 on the plane 45 according to a light beam from the light source 11 (11*a* to 11*c*). By incorporating the image projector according to the present invention which can perform close range image projection, the mobile phone 40 can project a large image on the plane 45, for example, an A4 size image in a range of about 240 mm from the deflection angle conversion element 14. With use of a currently popular mobile phone in an average size as the mobile phone 40, it is very easy to set a distance from the light emitting point of the projector 44 to the plane 45 in the optical axis direction (or shortest distance from the emitting point to a projected image) to about 240 mm or more. Accordingly, the mobile phone 40 can project good large images in at least about A4 size on the plane 45 without trapezoidal deformation. Thus, the mobile phone 40 can provide a very useful projector function to project about A4 size images on, for example, a desk on which it is placed.

Further, the projector 44 of the mobile phone 40 can improve visibility of large projected images in the very close range owing to the inclination of the optical axis direction Lb relative to the plane 45. This is because with the optical axis direction Lb inclined to the plane 45, the mobile phone 40 can be placed in a position outside viewers' fields of vision while they see a projected image. Whereas with the optical axis direction Lb perpendicular or almost perpendicular to the projection plane, the mobile phone 40 blocks viewers' fields of vision.

In the mobile phone 40 according to the sixth embodiment, the phone body 41 is placed in the open state for projecting an image on the plane 45, however, the present invention is not limited thereto as long as the projector function can be performed in a predetermined state for a desirable projection plane. The projection plane of the mobile phone does not have to be the plane on which it is placed, and it can be a screen hanging on the wall, for example. Also, in this case, it is possible to project large size images even in a very close projection range.

As described through the above embodiments, in the optical scan unit according to the present invention, the deflection angle conversion element has negative power to convert the deflection angle of a light beam deflected by the optical deflector into a larger scan angle. Accordingly, even with use of a rotatable mirror with small amplitude, it is possible to widely scan with a light beam irrespective of the upper limit of the amplitude and project images in a very close range.

Further, the deflection angle conversion element can be made of a single lens so that it makes easier to downsize the optical scan unit scanning at high field of angle, contributing to downsizing the projector incorporating the optical scan unit.

Further, the deflection angle conversion element can be comprised of plural lenses made of different glass materials. This makes it possible to reduce color aberration of color images formed by use of plural light sources and provide an image projector which can form images in high quality without color shifts.

The optical deflector is comprised of the first deflector portion and the first deflector portion integrated with each other. This enables downsizing of the optical deflector, leading to downsizing the entire optical scan unit.

Further, the optical deflector includes a mirror portion rotatable by the first and second deflector portions and the incidence angle of a light beam having passed through the divergent light conversion element relative to a normal line of the mirror portion is set at 45 degrees or less. This can reduce image deformation due to the magnitude of the incidence angle.

Further, the optical scan unit includes the rotatable mirror portion and a beam splitter so that it can reduce color aberration of color images formed by use of plural light sources and generate images without deformation due to the magnitude of the incidence angle. Accordingly, it is possible to provide an image projector which forms color images with high quality without color shifts.

Further, according to the present invention, the larger the deflection angle of the optical deflector, the larger the scan angle. Because of this, even with use of a rotatable mirror portion with small amplitude, it is possible to widely scan with a light beam irrespective of the upper limit of the amplitude and project images in a very close range. Also, it is possible to maintain a constant scan speed in a longer time so as to correct image deformation and unevenness in brightness.

Further, according to the present invention, the divergent light conversion element and the deflection angle conversion element each include lens faces rotationally symmetric around the optical axis. This facilitates the machining and assembly of the divergent light conversion element and the deflection angle conversion element because manufacture error and assembly error thereof can be set to a large value.

Further, the deflection angle conversion element can be a rotationally asymmetric lens so that it helps reduction in deformation or distortion of images on a projection plane projected with an inclined optical axis. It is also possible to improve quality of the spots such as the spot size and spot intensity.

According to the present invention, the deflection angle conversion element includes at least one aspheric face. Because of this, it can emit a light beam at a larger scan angle without enlarging the spot size on the projection plane.

According to the present invention, the image projector incorporating the above downsized optical scan unit can project large images with little deformation in a very close range. It can control the light emission timing or amount of the light source and project good images on a projection plane with little trapezoidal deformation, color shifts, and unevenness in brightness without a decrease in image resolution.

Further, according to the present invention, the vehicle head-up display incorporating the above downsized image projector can form large images in a very close range and provide good images with high visibility to a driver.

Further, the downsized image projector of the vehicle head-up display can perform the close range projection so that it can be placed in various areas of a vehicle.

According to the present invention, the mobile phone incorporating the above image projector can project good large images in a very close range without increasing the size thereof and provide them at high visibility to users.

Although the present invention has been described in terms of exemplary embodiments, it is not limited thereto. It should be appreciated that variations may be made in the embodiments described by persons skilled in the art without departing from the scope of the present invention as defined by the following claims.

The invention claimed is:

1. An optical scan unit comprising:

a light source;

first, second, and third lens faces which are included in first and second divergent light conversion elements having such positive power as to convert divergent light from the light source into convergent light to form a spot on a projection plane;

a control unit to control emission of the light from the light source;

an optical path combiner element to receive the light which has passed through the first, second, and third lens faces, to emit the light in first and second directions;

an optical deflector disposed on an optical path in the first direction to deflect light from the optical path combiner element in a first scan direction;

a deflection angle conversion element having such negative power as to convert a deflection angle of the light deflected by the optical deflector; and a light receiving element disposed on an optical path in the second direction to output a signal to the control unit in accordance with an amount of light received, wherein:

the control unit is configured to control the emission of the light from the light source by the signal output from the light receiving element, the light source includes first to third light sources to emit first to third color lights, respectively, the first lens face is used to convert divergent light from the first light source into convergent light, the second lens face is used to convert divergent light from the second light source to convergent light, the third lens face is used to convert divergent light from the third light source to convergent light, the optical path combiner element includes a first face and a second face opposing the first face, and is disposed to have the lights from the first divergent light conversion element be incident on the first face and the light from the second divergent light conversion element be incident on the second face, and emit the light from the second divergent light conversion element in the first and second directions, optical axes of the first and second lens faces are parallel to each other, normal lines of the first and second faces of the optical path combiner element are on a same plane and the optical path combiner element is a prism having a wedge-shape cross section along the same plane, and the light receiving element is disposed to receive the lights passing through the first to third lens faces emitted from the optical path combiner element.

2. An optical scan unit according to claim 1, wherein the deflection angle conversion element is made of a single lens.

3. An optical scan unit according to claim 1, wherein the deflection angle conversion element is made of a plurality of lenses formed of different glass materials.

4. An optical scan unit according to claim 1, wherein the deflection angle conversion element is a rotationally asymmetric lens.

5. An optical scan unit according to claim 1, wherein at least one face of the deflection angle conversion element is formed in an aspherical shape.

6. An optical scan unit according to claim 1, wherein an optical axis direction from the optical deflector to the deflection angle conversion element is inclined relative to a projection plane which is two-dimensionally scanned with light deflected by the optical deflector and emitted via the deflection angle conversion element.

7. An image projector comprising:

the optical scan unit according to claim 1; and a control unit controlling the optical scan unit, wherein the control unit comprises a light source control circuit which controls light emission of the light source, a deflection angle control circuit which controls a deflection angle of the optical deflector, and an image processing circuit which appropriately corrects acquired image data and outputs corrected image data to the deflection angle control circuit and the light source control circuit.

8. A vehicle head-up display device comprising the image projector according to claim 7.

9. A mobile phone comprising the image projector according to claim 7.

10. An optical scan unit according to claim 1, wherein:

the first light source and the second light source are comprised in a single light source device.

11. An optical scan unit according to claim 1, wherein:

the first and the second lens faces are comprised in a single one of the divergent light conversion elements.

* * * * *